(12) United States Patent
Ninose et al.

(10) Patent No.: US 8,782,354 B2
(45) Date of Patent: Jul. 15, 2014

(54) STORAGE APPARATUS AND METHOD OF CONTROLLING STORAGE APPARATUS

(75) Inventors: Kenta Ninose, Yokohama (JP); Yoshiaki Eguchi, Yokohama (JP); Akira Yamamoto, Sagamihara (JP); Ai Satoyama, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 233 days.

(21) Appl. No.: 13/141,622

(22) PCT Filed: Jun. 7, 2011

(86) PCT No.: PCT/JP2011/003211
§ 371 (c)(1),
(2), (4) Date: Jun. 22, 2011

(87) PCT Pub. No.: WO2012/168966
PCT Pub. Date: Dec. 13, 2012

(65) Prior Publication Data
US 2012/0317373 A1  Dec. 13, 2012

(51) Int. Cl.
*G06F 12/00* (2006.01)
(52) U.S. Cl.
USPC ..... 711/154; 171/154; 171/165; 171/E12.001
(58) Field of Classification Search
USPC .................................. 711/154, 165, E12.001
See application file for complete search history.

(56) References Cited

U.S. PATENT DOCUMENTS

| 7,685,361 B2 * | 3/2010 | Nashimoto et al. ........... 711/114 |
| 2005/0138241 A1 | 6/2005 | Fukuzawa et al. |
| 2006/0075200 A1 * | 4/2006 | Satoyama et al. ............ 711/162 |
| 2007/0050575 A1 | 3/2007 | Uratani et al. |
| 2007/0055704 A1 | 3/2007 | Watanabe et al. |
| 2009/0138630 A1 * | 5/2009 | Yasuta et al. .................... 710/38 |

FOREIGN PATENT DOCUMENTS

| EP | 1 569 083 A2 | 8/2005 |
| JP | 10-283272 | 10/1998 |

OTHER PUBLICATIONS

PCT International Search Report and Written Opinion on application PCT/JP2011/003211 dated Dec. 29, 2011; 14 pages.

* cited by examiner

*Primary Examiner* — Jasmine Song
(74) *Attorney, Agent, or Firm* — Foley & Lardner LLP

(57) ABSTRACT

Efficient data processing is implemented by using the functions of an external storage apparatus which is connected to the virtual storage apparatus.

A storage apparatus which is connected to a host apparatus which requests data I/Os and to an external storage apparatus comprising a storage device respectively via a network, comprising a storage device storing data which is read and written by the host apparatus; and a control device which controls data writing to a storage area, wherein the control device provides a predetermined storage area of the storage device of the external storage apparatus to the host apparatus as one or more virtual volumes, and manages the virtual volumes and function information indicating the functions of the external storage apparatus in association with one another.

11 Claims, 27 Drawing Sheets

FIG. 4

| DEVICE TYPE ID | FUNCTION | FUNCTION I/F | FUNCTION COMMAND TEMPLATE |
|---|---|---|---|
| R500 | DEDUP SNAPSHOT | COMMAND DEVICE | SNAPSHOT: ACQUISITION COMMAND FORMAT<br>SNAPSHOT: DELETION COMMAND FORMAT |
| R501 | SNAPSHOT | COMMAND DEVICE | SNAPSHOT: ACQUISITION COMMAND FORMAT<br>SNAPSHOT: DELETION COMMAND FORMAT |
| ... | ... | ... | ... |
| 2311 | 2312 | 2313 | 2314 |

| EXTERNAL VOLUME ID | DEVICE TYPE ID | FUNCTION | EXTERNAL VOLUME ADDRESS | LOGICAL VOLUME ID |
|---|---|---|---|---|
| #0001 | R500 | DEDUP SNAPSHOT | T-PORT#0001:LU#0010 | #FF00 |
| #0002 | R501 | SNAPSHOT | T-PORT#0002:LU#0011 | #DD00 |
| ... | ... | ... | ... | ... |
| 2321 | 2322 | 2323 | 2324 | 2325 |

| LOGICAL VOLUME ID | EXTERNAL VOLUME ID | EXTERNAL VOLUME ADDRESS |
|---|---|---|
| #FF00 | #0001 | T-PORT#0001:LU#0010 |
| #DD00 | #0002 | T-PORT#0002:LU#0011 |
| ... | ... | ... |
| 2331 | 2332 | 2333 |

| LOGICAL VOLUME ID | LBA | FREQUENCY INFORMATION | STORAGE TIER |
|---|---|---|---|
| NULL | NULL | NULL | NULL |
| #0001 | 0x00001000 | 100 | 1(LOGICAL VOLUME) |
| NULL | NULL | NULL | NULL |
| #FFBA | 0x12345000 | 1 | 3(VIRTUAL VOLUME (DEDUP)) |
| NULL | NULL | NULL | NULL |
| NULL | NULL | NULL | NULL |

2411 / 2412 / 2413 / 2414

F I G . 18

| LOGICAL VOLUME ID | STORAGE TIER | POOL VOLUME MANAGEMENT TABLE ADDRESS |
|---|---|---|
| #0001 | 1(LOGICAL VOLUME) | 0xAB8F FF00 |
| #0002 | 1(LOGICAL VOLUME) | 0x0011 5800 |
| #CA01 | 2(VIRTUAL VOLUME) | 0x808F 2240 |
| #FFBA | 3(VIRTUAL VOLUME (DEDUP)) | 0xDD47 0100 |
| 2421 | 2422 | 2423 |

242

F I G . 19

| DYNAMIC VOLUME ID | LBA |
|---|---|
| NULL | NULL |
| #8002 | 0x00001000 |
| NULL | NULL |
| NULL | NULL |

| SNAPSHOT VOLUME | LOGICAL VOLUME ID |
|---|---|
| PVOL | #FFA0 |
| TVOL[0] | #CC00 |
| TVOL[1] | NULL |
| TVOL[2] | #AA11 |

2511  2512

257

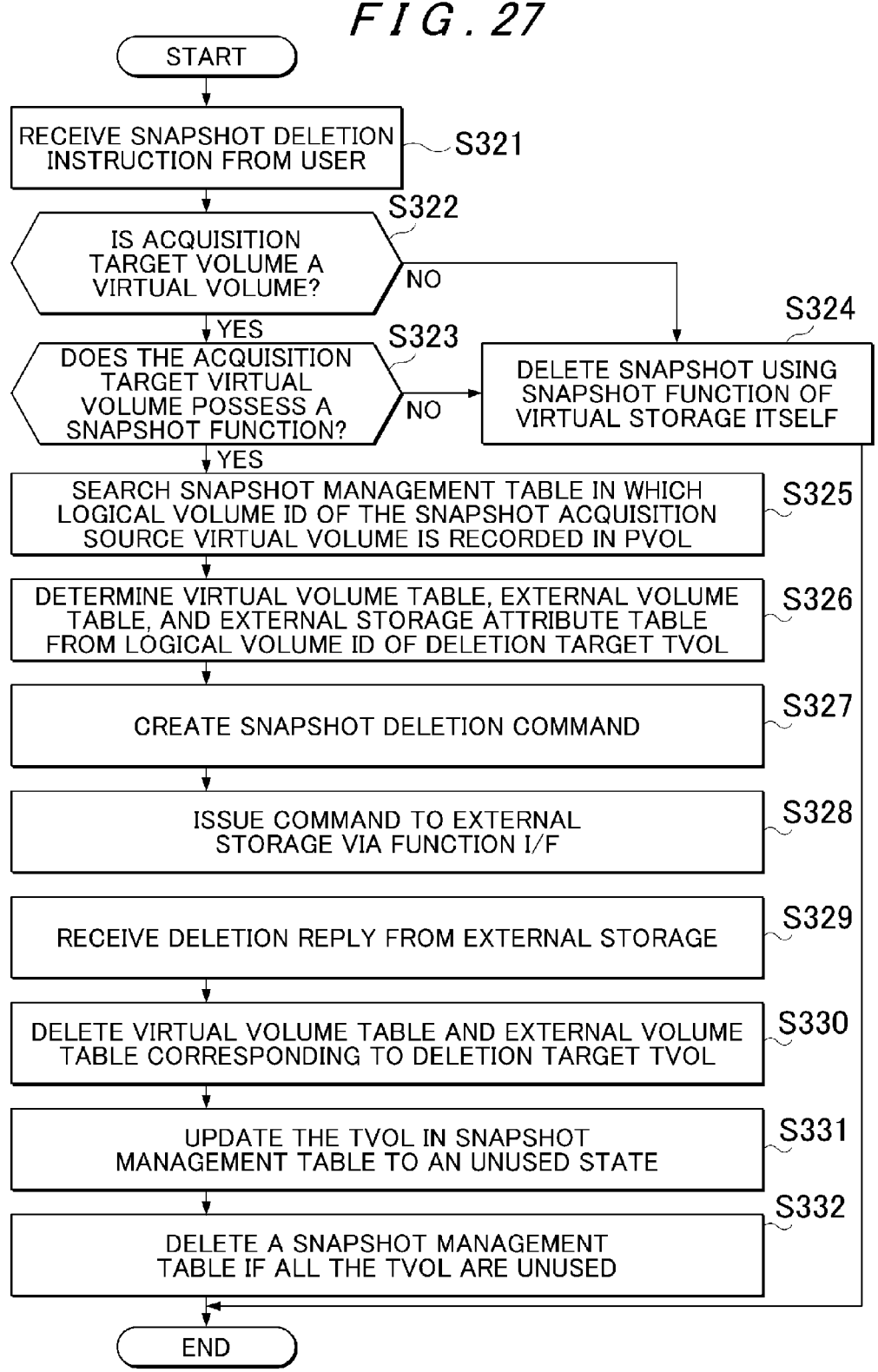

STORAGE APPARATUS AND METHOD OF CONTROLLING STORAGE APPARATUS

TECHNICAL FIELD

The present invention relates to a storage apparatus and method of controlling the storage apparatus and, more particularly, is suitably applied to a storage apparatus which utilizes storage area and functions of another storage apparatus, and a method of controlling the storage apparatus.

BACKGROUND ART

In recent years, in order to handle various large-volume data in various government, corporate and university institutions and other types of institutions, data has been managed using comparatively large-scale storage apparatuses. A large-scale storage apparatus of this kind is configured having a plurality of storage devices (hard disk drives and so on, for example) arranged in an array. For example, one RAID (Redundant Arrays of Independent Disks) group is configured from one or more hard disk drives, and one or more logical volumes are defined in a physical storage area provided by one RAID group. Furthermore, the logical volumes are provided to a host apparatus. The host apparatus is able to perform data writing and reading by transmitting predetermined commands to the logical volumes.

In order to handle the various large-volume data, a storage apparatus (hereinafter a storage apparatus will be referred to as a virtual storage apparatus), which provides a storage area of another storage apparatus to the host apparatus as part of its own storage area, is realized. For example, PTL1 discloses a technology which connects another storage apparatus (hereinafter the other storage apparatus will be described using the term external storage apparatus) to the virtual storage apparatus and provides virtual volumes to the host apparatus. By using actual volumes in the external storage apparatus (hereinafter the actual volumes are described using the term real volumes) as the storage area of the virtual volumes, the storage area of the external storage apparatus can be used as if this storage area were part of the storage area of the virtual storage apparatus.

CITATION LIST

Patent Literature

PTL 1: Japanese Published Unexamined Patent Application No. H10-283272

SUMMARY OF INVENTION

Technical Problem

However, according to PTL1, the virtual storage apparatus utilizes the storage area in the external storage apparatus, but various functions of the external storage apparatus cannot be used effectively by the virtual storage apparatus. Examples of the storage apparatus functions include a deduplication function which performs compression by deleting duplicate parts when data is stored in the storage area. For example, even when an external storage apparatus with a deduplication function is connected to the virtual storage apparatus, the virtual storage apparatus itself has to support these functions.

The present invention was devised in view of the aforementioned problems, and seeks to propose a storage apparatus and a method of controlling the storage apparatus which enable functions of an external storage apparatus connected to a virtual storage apparatus to be utilized.

Solution to Problem

In order to achieve the foregoing object, the present invention provides a storage apparatus which is connected to a host apparatus which requests data I/Os and to an external storage apparatus comprising a storage device respectively via a network, comprising a storage device storing data which is read and written by the host apparatus; and a control device which controls data writing to a storage area, wherein the control device provides a predetermined storage area of the storage device of the external storage apparatus to the host apparatus as one or more virtual volumes, and manages the virtual volumes and function information indicating the functions of the external storage apparatus in association with one another.

With this configuration, efficient data processing can be implemented by using the functions of the external storage apparatus connected to the virtual storage apparatus.

Advantageous Effects of Invention

According to the present invention, efficient data processing can be implemented by using the functions of the external storage apparatus connected to the virtual storage apparatus.

BRIEF DESCRIPTION OF DRAWINGS

FIG. 4 is a diagram showing the content of an external storage attribute table according to the first embodiment.

FIG. 5 is a diagram showing the content of an external volume table according to the first embodiment.

FIG. 6 is a diagram showing the content of a virtual volume table 233 according to the first embodiment.

FIG. 17 is a diagram showing content of a dynamic volume mapping table according to the second embodiment.

FIG. 18 is a diagram showing content of a pool management table according to the second embodiment.

FIG. 19 is a diagram showing content of a pool volume management table according to the second embodiment.

FIG. 25 is a diagram showing content of a snapshot management table according to the third embodiment.

FIG. 27 is a flowchart showing processing content of snapshot deletion processing according to the third embodiment.

DESCRIPTION OF EMBODIMENTS

An embodiment of the present invention will be described in detail hereinbelow with reference to the drawings.

Figure 1:
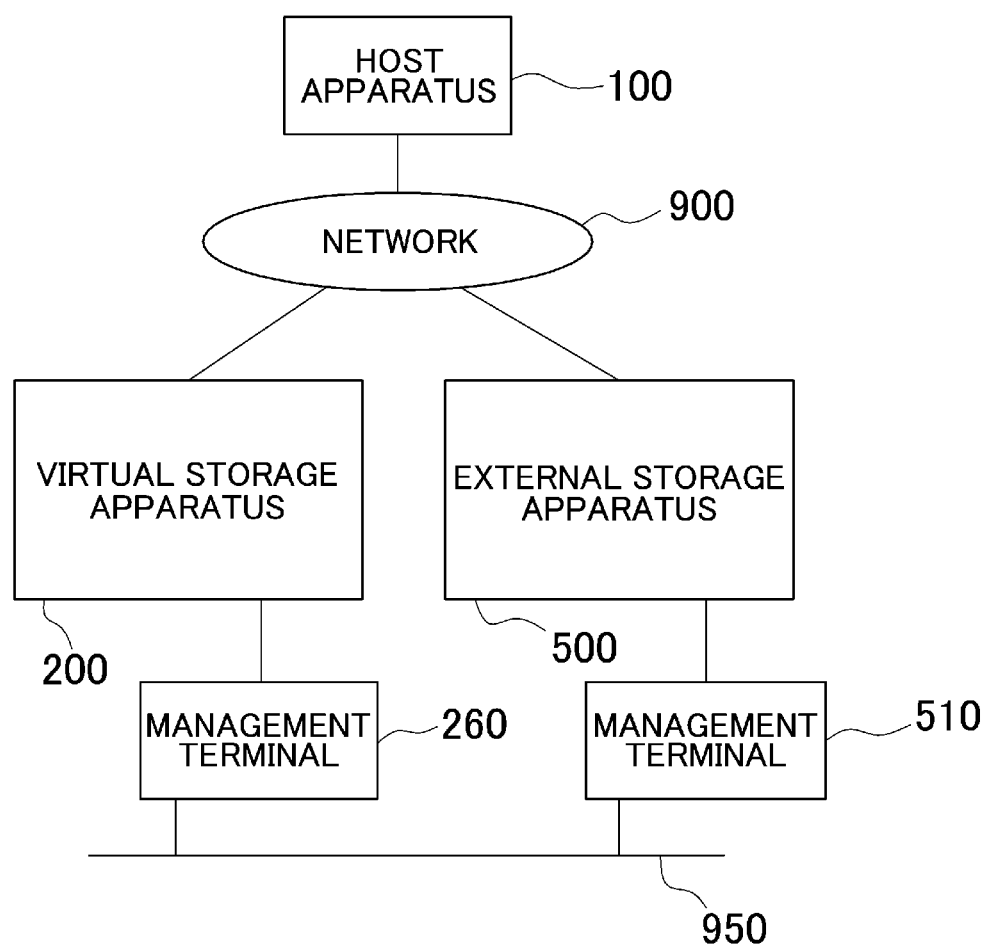
FIG. 1 is a block diagram showing the overall configuration of a computer system according to a first embodiment of the present invention.

(1) First Embodiment (1-1) Hardware Configuration of Computer System. The hardware configuration of a computer system 1 according to this embodiment will first be described. As shown in FIG. 1, the computer system 1 is configured from a host apparatus 100, a virtual storage apparatus 200, a management terminal 260, an external storage apparatus 500, a management terminal 510, and a network 900.

The host apparatus 100 is a computer system which comprises information processing resources such as a CPU (Central Processing Unit), and memory, and is configured from a personal computer, a workstation, or a mainframe and the like, for example. The CPU functions as an arithmetic processing device and controls the operation of the host apparatus 100 according to programs and arithmetic parameters and the like which are stored in the memory. In addition, the host apparatus 100 comprises information input devices such as a keyboard, a switch, a pointing device and a microphone, and information output devices such as a monitor display and speaker and the like.

Furthermore, the host apparatus 100 is connected to the virtual storage apparatus 200 or the external storage apparatus 500 via the network 900. The network 900 is configured, for example, from a SAN (Storage Area Network) or the like, and communication between the apparatuses is performed according to the Fiber Channel protocol, for example. Furthermore, the network 900 may also be a LAN (Local Area Network), the Internet, a public line or a dedicated line or the like, for example. If the network is a LAN, communication between apparatuses is performed according to the TCP/IP (Transmission Control Protocol/Internet Protocol), for example.

In addition, the host apparatus 100 is an apparatus which performs predetermined task processing by executing software such as a database management system. Further, part or all the data used in the task processing executed by the host apparatus 100 is stored in the virtual storage apparatus 200 or external storage apparatus 500. In order to refer to and update the data stored in the virtual storage apparatus 200 or external storage apparatus 500, the host apparatus 100 transmits a read request or write request to the virtual storage apparatus 200 via the network 900.

The virtual storage apparatus 200 is connected to the host apparatus 100 via the network 900 and parses commands transmitted from the host apparatus 100 and executes reading/writing to storage media in the virtual storage apparatus 200 or external storage apparatus 500. Furthermore, the virtual storage apparatus 200 is connected to the external storage apparatus 500 via the network 900 and provides storage area in the external storage apparatus 500 to the host apparatus as part of its own storage area. The storage area provided by the virtual storage apparatus 200 will be described in detail subsequently.

The management terminal 260 is a computer apparatus which comprises information processing resources such as a CPU and memory, and is configured from a personal computer, a workstation, or a mainframe or the like, for example. The CPU functions as an arithmetic processing device and controls the operation of the management terminal 260 according to the programs and arithmetic parameters and so on stored in the memory. Furthermore, the management terminal 260 comprises information input devices such as a keyboard, switch, pointing device, a microphone and comprises information output devices such as a monitor display and a speaker and is a device which manages a virtual storage apparatus 200 in response to inputs from an operator or the like.

In addition, the management terminal 260 is connected to the virtual storage apparatus 200 and another management terminal 510 via a network 950. The network 950 is configured from a SAN or LAN or the like, for example, like the network 900.

Furthermore, the programs stored in the memory of the management terminal 260 are programs which manage the storage media or the like of the virtual storage apparatus 200 and manage, for example, the RAID group configuration and the capacity and the like of logical volumes which are configured from part of the RAID group. The management terminal 260 transmits commands corresponding to user operations and the like to the virtual storage apparatus 200 and changes RAID configuration information and so on.

The external storage apparatus 500 is connected to the virtual storage apparatus 200 via the network 900 and comprises a function for providing the storage area in the external storage apparatus 500 to the virtual storage apparatus 200. More specifically, the virtual storage apparatus 200 transfers a request to the external storage apparatus 500 if the target of a read/write request from the host apparatus 100 is the storage area in the external storage apparatus 500. The external storage apparatus 500 executes read/write processing on the data stored in its own storage area in response to the read/write request transferred from the virtual storage apparatus 200 and sends back the execution result to the virtual storage apparatus 200.

The management terminal 510 is a computer apparatus which comprises information processing resources such as a CPU and memory and is configured, for example, from a personal computer, a workstation, or a mainframe and the like, for example. The CPU functions as an arithmetic processing device and controls the operation of the management terminal 510 according to programs and arithmetic parameters and the like which are stored in the memory. In addition, the management terminal 510 comprises information input devices such as a keyboard, a switch, a pointing device and a microphone, and information output devices such as a monitor display and speaker and the like, and is a device which manages the external storage apparatus 500 in response to inputs from the operator or the like. The configuration of the management terminal 510 is the same as the management terminal 260 and a detailed description thereof is omitted here.

(1-2) Configuration of Virtual Storage Apparatus (1-2-1) Hardware Configuration

Figure 2:
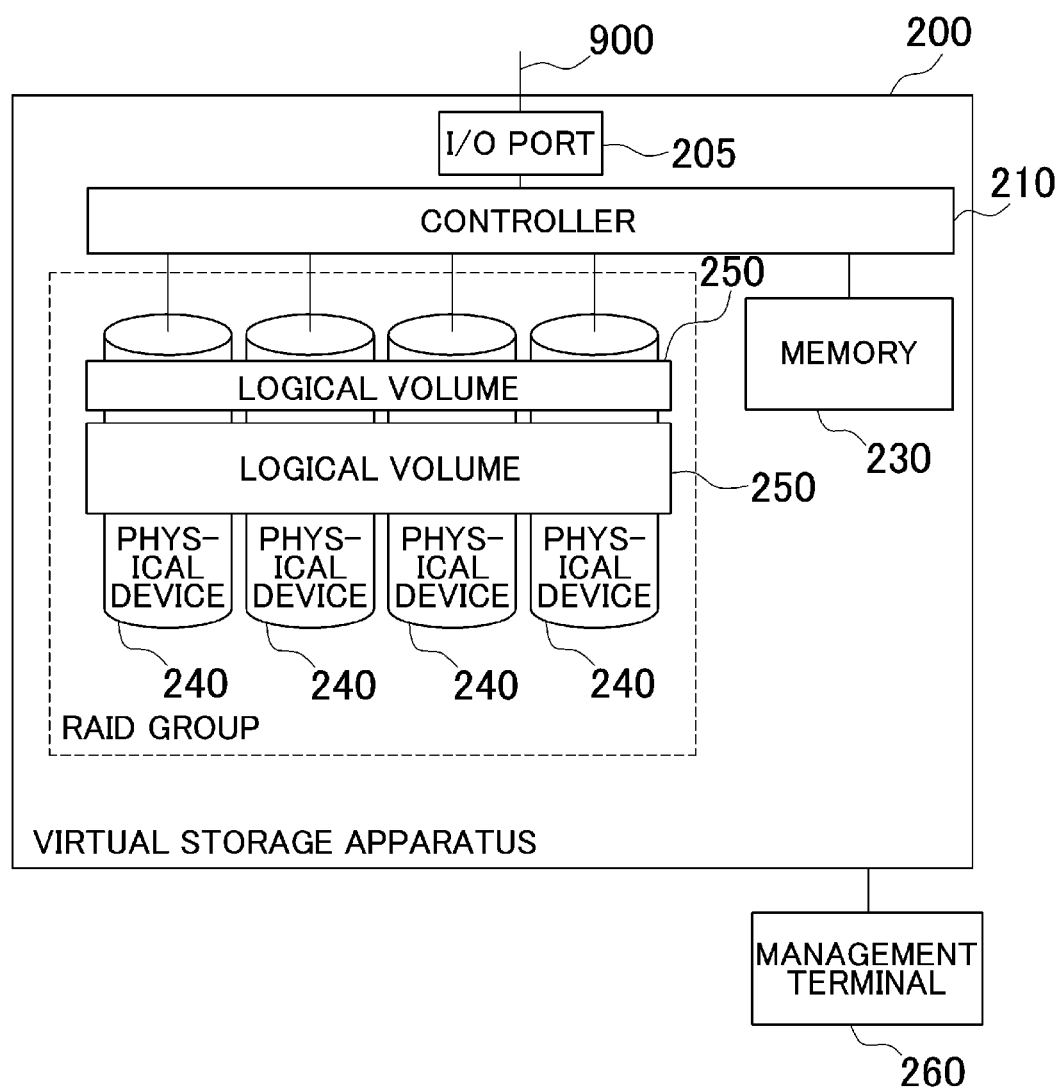
FIG. 2 is a block diagram showing the configuration of a virtual storage apparatus according to the first embodiment.

As shown in FIG. 2, the virtual storage apparatus 200 is configured from an I/O port 205, a controller 210, a memory 230, and physical devices 240.

The I/O port 205 is a port for connecting the virtual storage apparatus 200 to the network 900. The virtual storage apparatus 200 sends and receives data and commands and the like to and from the host apparatus 100 via the I/O port 205. The I/O port 205 is assigned a network address such as a WWN (World Wide Name) or IP (Internet Protocol) address for uniquely identifying the I/O port 205 on the network 900.

The controller 210 is a processor which controls the whole virtual storage apparatus 200. The controller 210 executes control processing for the whole virtual storage apparatus 200 by running various control programs which are stored in the memory 230, described subsequently.

The memory 230 is configured from a nonvolatile semiconductor memory, for example, and stores various control programs and control data and the like. The memory 230 is also used as a cache memory for temporarily archiving data which is read/written to/from the physical devices 240.

The physical devices 240 are configured, for example, from high-cost disks such as SSD (Solid State Disks) or SCSI (Small Computer System Interface) disks and low-cost disks such as SATA (Serial AT Attachment) disks or optical disks. For example, a single RAID (Redundant Arrays of Inexpensive Disks) group is configured from a plurality of physical devices 240, and one or more logical volumes (hereinafter called logical volumes 250) are configured in a physical storage area provided by one or more physical devices 240 which constitute a single RAID group. Furthermore, data from the host apparatus 100 is stored using blocks of a predetermined size as units in the logical volumes 250.

Furthermore, the logical volumes 250 are each assigned unique identifiers (hereinafter called logical volume IDs). In the case of this embodiment, the data I/Os are performed by designating addresses which are formed by combining the volume IDs with unique numbers (LBA: Logical Block Address) which are assigned to each of the logical blocks.

In addition, the virtual storage apparatus 200 is able to provide the storage area of the external storage apparatus 500 to the host apparatus 100 as part of its own storage area. More specifically, the virtual storage apparatus 200 is connected to the external storage apparatus 500 and associates real volumes in the external storage apparatus 500 with the virtual volumes of the virtual storage apparatus 200. The storage area of the external storage apparatus 500 can accordingly be provided to the host apparatus 100 as part of the storage area of the virtual storage apparatus 200. Note that virtual volumes 280, and dynamic volumes 300 which are described subsequently, are also included in the logical volumes. Accordingly, the virtual volumes 280 and dynamic volumes 300 described subsequently, also employ combinations of logical volume IDs and LBA as data I/O addresses. Hence, logical volume IDs are also assigned to the virtual volumes 280 and dynamic volumes 300. That is, the logical volume IDs are assigned as unique identifiers for all the logical volumes 250, all the virtual volumes 280, and all the dynamic volumes 300 which are held by the virtual storage apparatus 200. In the above-described case where only logical volumes 250 are described which are configured by the virtual storage apparatus 200 itself using physical devices 240, such volumes are represented as "normal logical volumes."

In this embodiment, as described earlier, not only is the storage area in the external storage apparatus 500 used by the virtual storage apparatus 200 but also the functions of the external storage apparatus 500 can be utilized. Examples of the storage apparatus functions include, for example, a deduplication function and a snapshot function of the external storage apparatus 500. According to this embodiment, data processing can be made efficient by effectively using the functions of the external storage apparatus 500 which is connected to the virtual storage apparatus 200.

(1-2-2) Software Configuration

Figure 3:
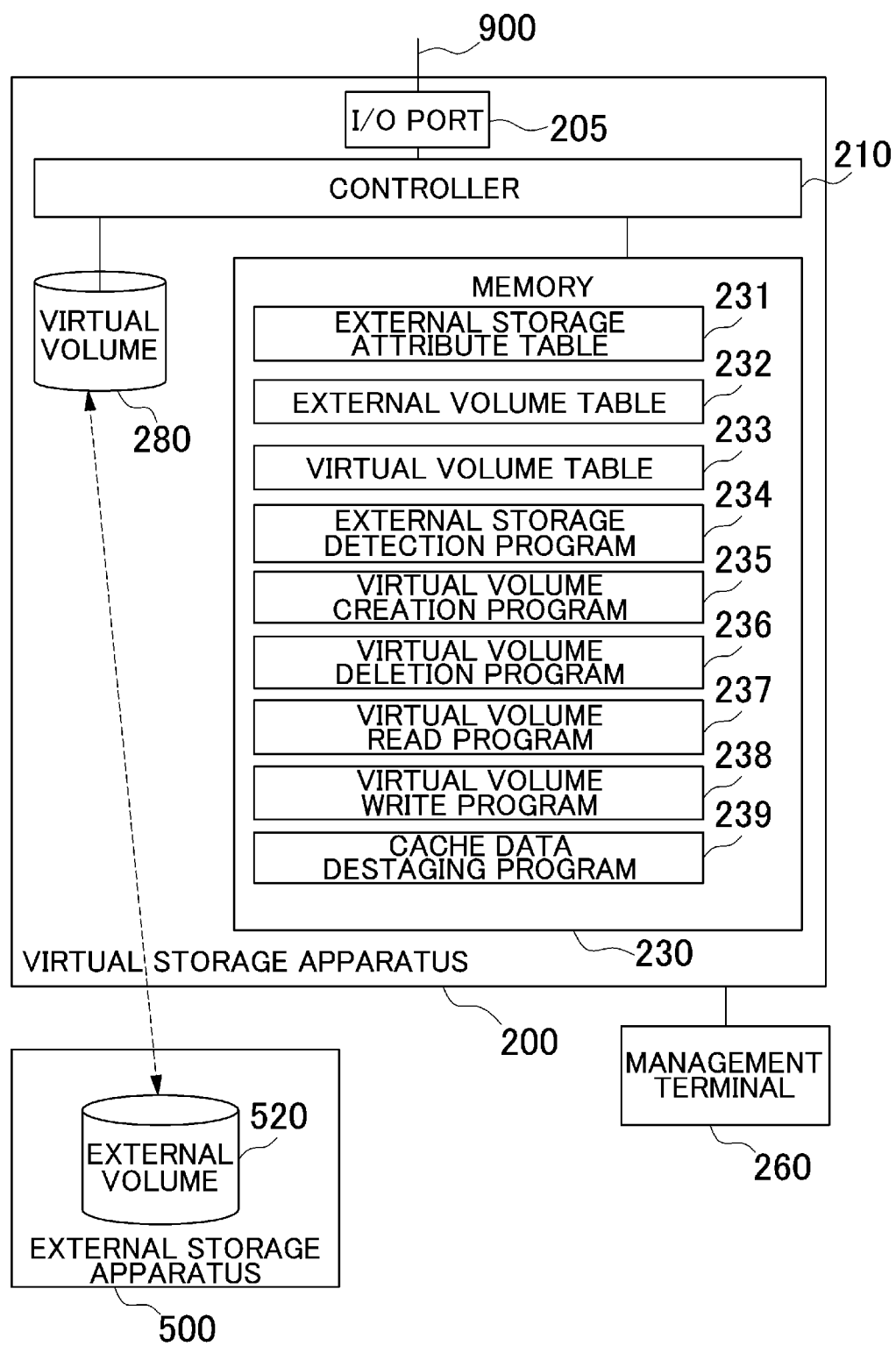
FIG. 3 is a block diagram showing control information of a virtual storage apparatus according to the first embodiment.

As mentioned earlier, the memory 230 stores various control programs and control data and the like. More specifically, the memory 230 stores, as shown in FIG. 3, an external storage attribute table 231, an external volume table 232, a virtual volume table 233, an external storage detection program 234, a virtual volume creation program 235, a virtual volume deletion program 236, a virtual volume read program 237, a virtual volume write program 238, and a cache data destaging program 239.

The external storage attribute table 231 is a table for managing various attributes of the external storage apparatus 500 and, as shown in FIG. 4, is configured from a device type ID field, a function field 2312, a function I/F field 2313, and a function command template field 2314. The device type ID field 2311 stores identification information for identifying the device type of the external storage apparatus 500. The function field 2312 stores information indicating the functions of the external storage apparatus 500. The function I/O field 2313 stores information indicating an interface when using the functions of the external storage apparatus 500. The function command template 2314 stores information on command templates when using the functions of the external storage apparatus 500, and other such templates. Note that, in this Example, it is assumed that the external storage attribute table 231 is pre-generated in response to a system administrator input and stored in the memory 230. However, the external storage attribute table 231 may also be created using another method such as by providing a special interface between the virtual storage apparatus 200 and the external storage apparatus 500 so that the virtual storage apparatus 200 is able to collect various attributes from the external storage apparatus 500.

The external volume table 232 is a table for managing external volumes of the external storage apparatus 500 and, as shown in FIG. 5, stores an external volume ID field 2321, a device type ID field 2322, a function field 2323, an external volume address field 2324, and a logical volume ID field 2325. The external volume ID field 2321 stores identification information for identifying the external volumes. The external volume ID is information enabling the virtual storage apparatus 200 to uniquely identify the external volumes. The device type ID field 2322 stores, in the device type ID field 2322, information identifying the device types of the external storage apparatus 500 to which the external volume belongs.

The function field 2323 stores information indicating the functions of the external storage apparatus 500 to which the external volume belongs. The external volume address field 2324 stores addresses of the external volumes. More specifically, the external volume address is configured from information (T-Port#0001) identifying the port of the external storage apparatus 500, and an LU (Logical Unit) number (LU#0010) which is uniquely identified on the port. The logical volume ID field 2325 stores information identifying the virtual volume in the virtual storage apparatus 200 which is associated with the external volume stored in the external volume ID field 2321.

The virtual volume table 233 is a table for managing virtual volumes in the virtual storage apparatus 200 and, as shown in FIG. 6, is configured from a logical volume ID field 2331, an external volume ID field 2332, and an external volume address field 2333. The logical volume ID field 2331 stores information identifying virtual volumes in the virtual storage apparatus 200. The external volume ID field 2332 stores identification information identifying the external volumes. The external volume address 2333 stores the addresses of the external volumes.

The external storage detection program 234 is a program for detecting the external storage apparatus 500 which is connected to the virtual storage apparatus 200. More specifically, the external storage detection program 234 executes a probe command to search for the external storage apparatus 500 via the connection port connected to the external apparatus and detect external volumes of the external storage apparatus 500. Furthermore, the external storage detection program 234 stores the addresses of the detected external volumes and attributes and the like of the external storage apparatus 500 to which the external volumes belong in association with one another in the external volume table 232.

The virtual volume creation program 235 is a program for creating virtual volumes by associating an external volume with a virtual volume which is created in the virtual storage apparatus 200. More specifically, the virtual volume creation program 235 newly creates the virtual volume table 233 in response to a request from the management terminal 260 and stores logical volume IDs identifying the virtual volumes and external volume IDs identifying the external volumes in the virtual volume table 233 in association with one another. Furthermore, the virtual volume creation program 235 stores the logical volume IDs which correspond to the external volume IDs stored in the external volume table 232 in association with the external volume IDs.

The virtual volume deletion program 236 is a program for deleting the virtual volumes which are created in the virtual storage apparatus 200. More specifically, the virtual volume deletion program 236 refers to the virtual volume table 233 with the logical volume ID of a deletion-target virtual volume in response to a request from the management terminal 260 and deletes the deletion target logical volume ID stored in the external volume table which contains the external volume ID associated with the virtual volume. In addition, the virtual volume deletion program 236 deletes the virtual volume table 233 which contains the logical volume ID of the deletion target virtual volume.

The virtual volume read program 237 is a program which reads the data in the virtual volume in the virtual storage apparatus 200 in response to the read request from the host apparatus 100. The virtual volume write program 238 is a program which writes data to the virtual volume in the virtual storage apparatus 200 in response to a write request from the host apparatus 100. In reality, the virtual volume write program 238 stores the data transferred from the host apparatus 100 as well as information indicating the data storage destination in the cache entry in the virtual storage apparatus 200.

The cache data destaging program 239 is a program which stores data, which has been written to the cache entry in the virtual storage apparatus 200, in the real volume in the virtual storage apparatus 200 or in the real volume in the external storage apparatus 500.

In this embodiment, when the virtual storage apparatus 200 identifies the external storage apparatus 500 which is connected to the virtual storage apparatus 200, the virtual storage apparatus 200 acquires information indicating which functions the external storage apparatus 500 possesses. The virtual storage apparatus 200 is then able to present the information on the functions which the external storage apparatus 500 possesses to the system administrator of the virtual storage apparatus 200. Hence, the system administrator is able to select an external volume of the external storage apparatus 500 which has the desired function when assigning an external volume of the external storage apparatus 500 to a virtual volume of the virtual storage apparatus 200. Suppose, for example, that the virtual storage apparatus 200 does not possess a deduplication function (Dedup function) but the external storage apparatus 500 possesses the deduplication function. In this case, by associating an external volume of the external storage apparatus 500 which possesses the deduplication function with the virtual volume of the virtual storage apparatus 200, the virtual storage apparatus 200 is able to utilize the deduplication function of the external storage apparatus 500. Thus, according to this embodiment, not only is the storage area of the external storage apparatus 500 used as part of the storage area of the virtual storage apparatus 200, but the functions which the external storage apparatus 500 possesses and are not possessed by the virtual storage apparatus 200 can be used as if they were functions of the virtual storage apparatus 200.

(1-3) Details of the Operation of the Virtual Storage Apparatus

Details of the operation of the virtual storage apparatus 200 will be provided next. The virtual storage apparatus 200 executes external storage detection processing to detect the external storage apparatus 500, virtual volume creation processing to create virtual volumes, virtual volume deletion processing to delete virtual volumes, virtual volume read processing to read data of the virtual volumes, virtual volume write processing to write data to the virtual volumes, and cache data destaging processing to destage data of the cache entry of the virtual storage apparatus 200.

Figure 7:
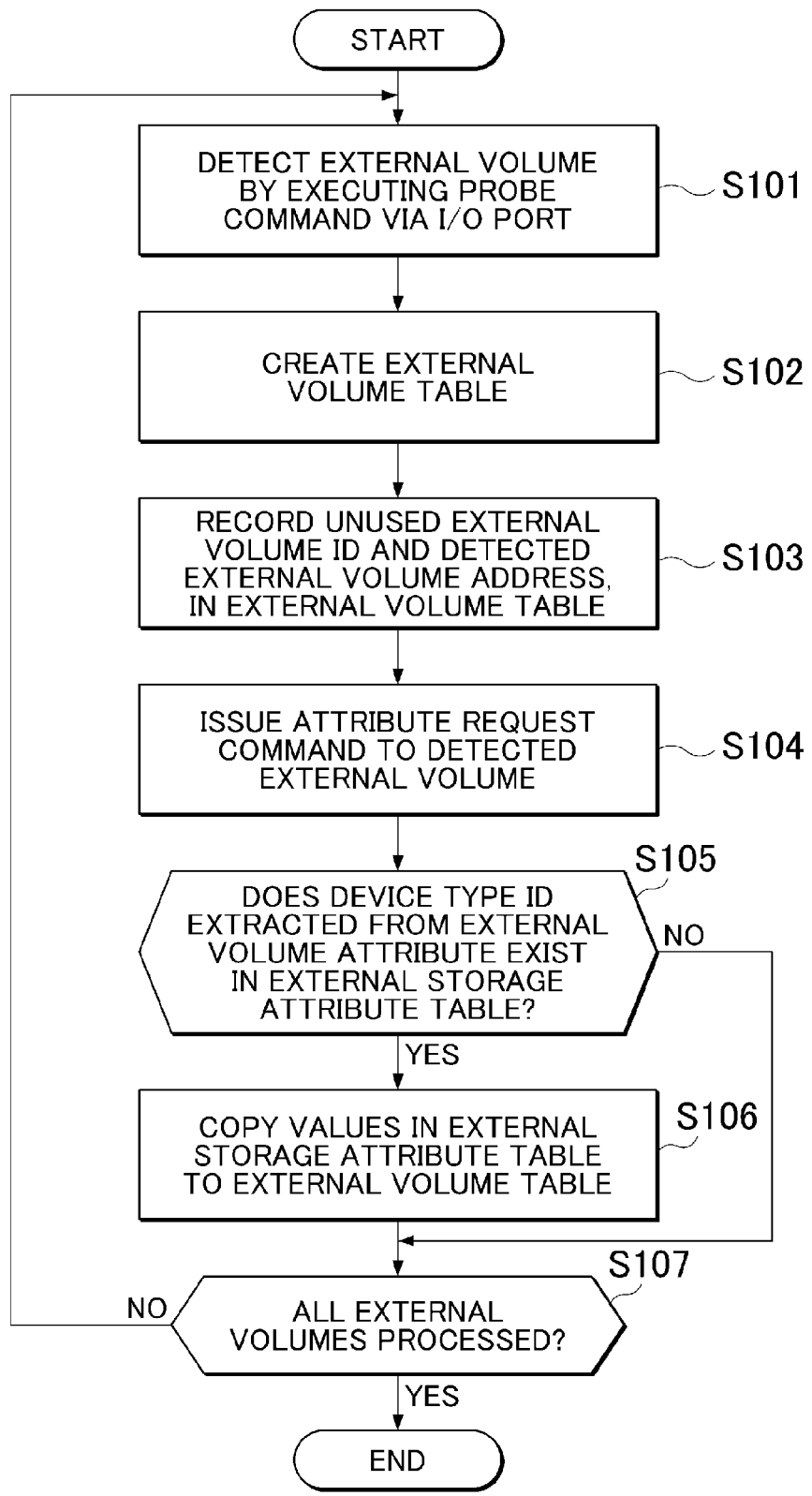
FIG. 7 is a flowchart showing the processing content of external storage detection processing according to the first embodiment.

The external storage detection processing which is executed by the external storage detection program 234 will be described first. As shown in FIG. 7, the external storage detection program 234 executes a probe command to search for an external storage apparatus 500 via a connection port (I/O port) connected to the external apparatus and detects the external volumes of the external storage apparatus 500 (S101). More specifically, the external storage detection program 234 detects the external volumes of the external storage apparatus 500 and acquires the addresses of the external volumes.

The external storage detection program 234 then newly creates and initializes the external volume table 232 (S102). Furthermore, the external storage detection program 234 acquires unused external volume IDs and records the external volume IDs and the addresses of the external volumes detected in step S101 in the external volume table 232 in association with one another (S103).

Further, the external storage detection program 234 issues an attribute request command to an external volume detected in step S101 (S103). More specifically, the external storage detection program 234 issues an attribute request command to the external volume and acquires attribute information on the device type and functions and the like of the external storage apparatus 500 to which the external volume belongs.

The external storage detection program 234 then determines whether the same device type ID as the device type ID contained in the attribute information of the external volume acquired in step S103 exists in the external storage attribute table 231 (S105). As mentioned earlier, the external storage attribute table 231 is a pre-generated table stored in the memory 230 and which stores attribute information of the external storage apparatus 500 which is likely to be connected to the virtual storage apparatus 200.

If step S105 yields a match between the device type ID contained in the attribute information of the external volume and the device type ID of the external storage attribute table 231, the external storage detection program 234 copies the value, in the external storage attribute table 231 which corresponds to this device type, to the external volume table 232 (S106). More specifically, the external storage detection program 234 acquires attribute information on the functions and the like which correspond to the device type ID contained in the external volume attribute information from the function field 2312 in the external storage attribute table 231, the function I/F field 2313, and the function command template field 2314 and records this information in association with the external volume ID of the external volume table 232.

If it is determined in step S105 that a device type ID which is the same as the device type ID contained in the external volume attribute information does not exist in the external storage attribute table 231, the external storage detection program 234 advances to the processing of step S107.

The external storage detection program then determines whether the processing of steps S102 to S106 has been executed for the external volumes detected in step S101 (S107). If it is determined in step S107 that the processing has not been executed for all the external volumes, the external storage detection program 234 repeats the processing of step S101. If, however, it is determined in step S107 that the processing has been carried out for all the external volumes, the external storage detection program 234 terminates the processing.

Figure 8:
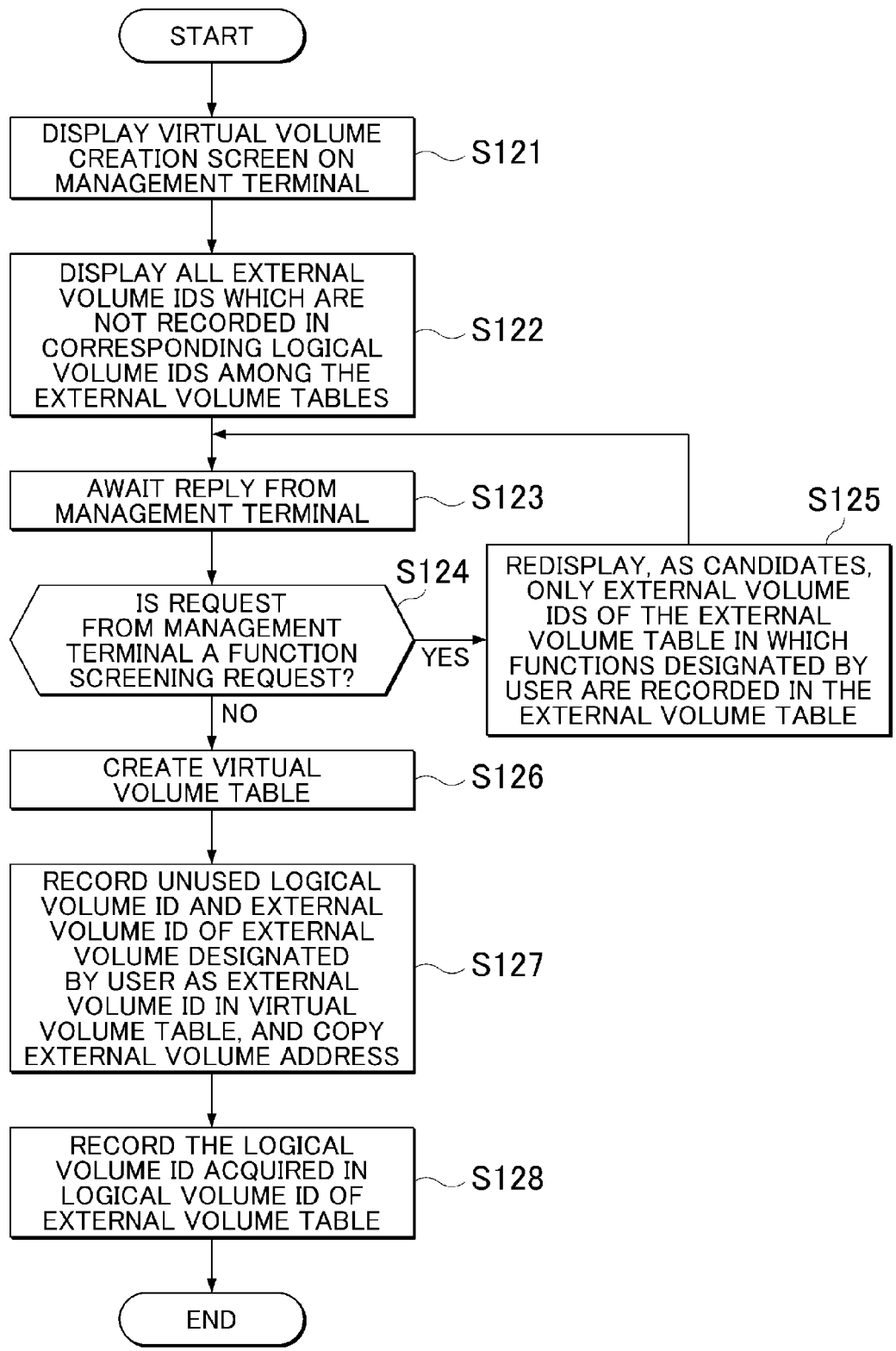
FIG. 8 is a flowchart showing the processing content of virtual volume creation processing according to the first embodiment.

The virtual volume creation processing which is executed by the virtual volume creation program 235 will be described next. As shown in FIG. 8, the virtual volume creation program 235 first displays an external volume creation screen 800 on the display screen of the management terminal 260 (S121).

Figure 9:
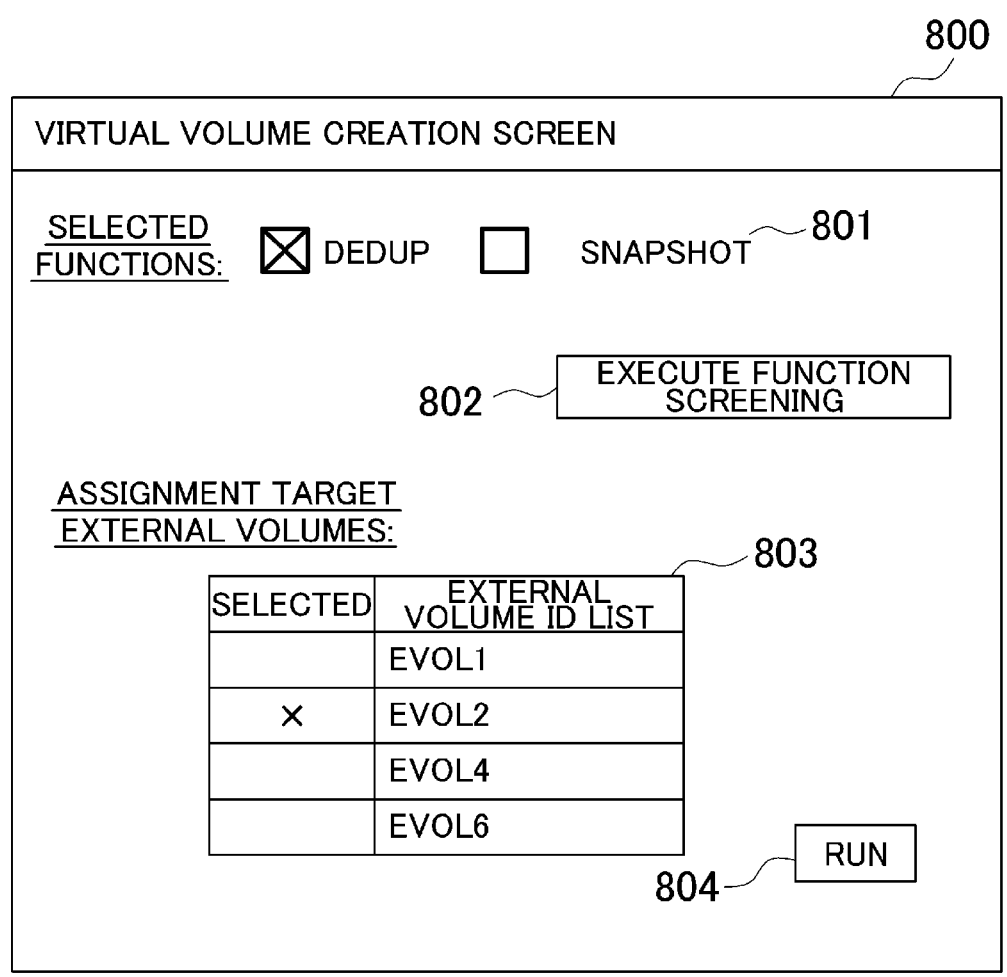
FIG. 9 is a conceptual diagram showing a virtual volume creation screen according to the first embodiment.

The virtual volume creation screen 800 displayed on the management terminal 260 will be described here. As shown in FIG. 9, the virtual volume creation screen 800 displays a selected function field 801 and an assignment target external volume field 803. The selected function field 801 displays the functions of the external storage apparatus 500 which is connected to the virtual storage apparatus 200. The desired function is selected from the selected function field 801 in response to a system administrator input and a function screening execution button 802 is pressed. Furthermore, the assignment target external volume field 803 displays a list of external volumes with the selected function in the selected function field 801. The desired external volume is selected from the assignment target external volume field 803 in response to a system administrator input and the Run button 804 is pressed.

Returning to FIG. 8, the virtual volume creation program 235 refers to the external volume table 232 and displays all the external volume IDs for which no logical volume ID has been recorded in the corresponding logical volume ID field 2325, in the external volume table 232, on the virtual volume creation screen 800 (S122). More specifically, the virtual volume creation program 235 displays the external volume IDs in the assignment target external volume field 803 of the virtual volume creation screen 800.

Furthermore, the virtual volume creation program 235 awaits a reply from the management terminal 260 (S123). The virtual volume creation program 235 then determines whether the request from the management terminal 260 is a function screening request (S124). A function screening request which is transmitted by the management terminal 260 is transmitted as a result of the function screening Run button 802 of the virtual volume creation screen 800 being pressed. Furthermore, when the Run button 804 of the virtual volume creation screen 800 is pressed, an external volume assignment execution request is transmitted by the management terminal 260.

If it is determined in step S124 that the request from the management terminal 260 is a function screening request, the virtual volume creation program 235 displays a list of the external volumes which possess the function designated by the user in the external volume table 232 on the virtual volume creation screen 800. More specifically, the virtual volume creation program 235 acquires only the external volume IDs in the external volume table 232 in which the function designated by the user is recorded and re-displays these external volume IDs in the assignment target external volume field 803 of the virtual volume creation screen 800 (S125). Thereafter, the virtual volume creation program 235 advances to the processing of step S123.

If, however, it is determined in step S125 that the request from the management terminal 260 is not a function screening request, that is, if an external volume assignment execution request is transmitted by the management terminal, the virtual volume creation program 235 newly creates and initializes the virtual volume table 233 (S126). The virtual volume creation program 235 then acquires unused logical volume IDs and records the logical volume IDs together with the external volume designated by the user in the virtual volume table 233 in association with one another (S127). More specifically, the virtual volume creation program 235 records the external volume ID of the external volume designated by the user in the external volume ID field 2332 in the virtual volume table 233. Furthermore, the virtual volume creation program 235 refers to the external volume table 232 and acquires an external volume address which corresponds to the external volume ID and records the external volume address in the external volume address field 2333 in the virtual volume table 233.

The virtual volume creation program 235 then records the logical volume IDs acquired in step S127 in the logical volume ID field 2325 in the external volume table 232 (S128).

As a result of the list of external volumes which possess the function desired by the system administrator being displayed on the management terminal 260 in the foregoing step S125 in this way, the system administrator is able to identify the functions of the external storage apparatus 500. Furthermore, by prompting the system administrator to select the external volume which corresponds to the virtual volume from the list of external volumes displayed on the management terminal 260, the system administrator can be provided with the functions which the external storage apparatus 500 possesses in addition to the functions which the virtual storage apparatus 200 possesses.

Figure 10:
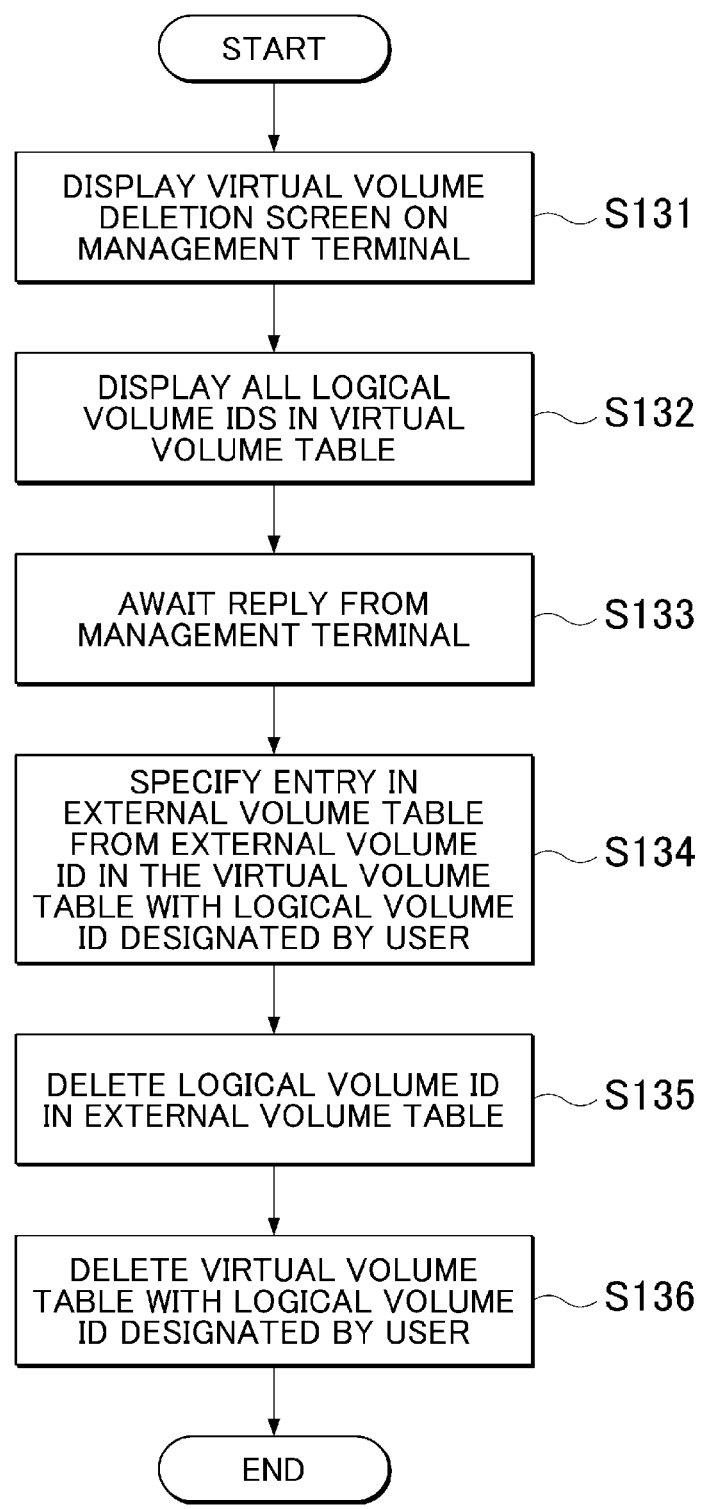
FIG. 10 is a flowchart showing processing content of virtual volume deletion processing according to the first embodiment.

Virtual volume deletion processing which is executed by the virtual volume deletion program 236 will be described next. As shown in FIG. 10, the virtual volume deletion program 236 first displays the virtual volume deletion screen 810 on the management terminal 260 (S131).

Figure 11:
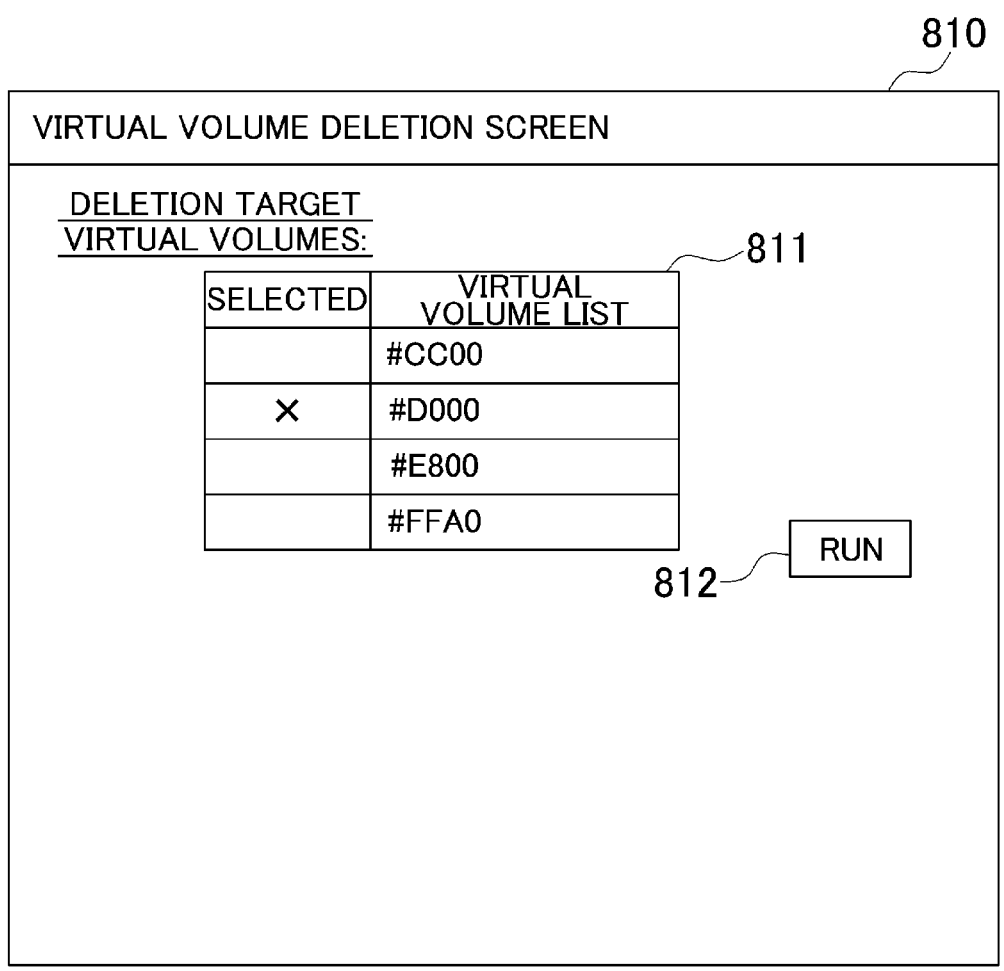
FIG. 11 is a conceptual diagram showing a virtual volume deletion screen according to the first embodiment.

The virtual volume deletion screen 810 which is displayed on the management terminal 260 will be described at this point. As shown in FIG. 11, the virtual volume deletion screen 810 displays a deletion target virtual volume field 811. The deletion target virtual volume field 811 displays a list of virtual volumes of the virtual storage apparatus 200. A deletion target virtual volume is selected from the virtual volumes displayed on the deletion target virtual volume field 811 in response to a system administrator input, and a Run button 812 is pressed.

Returning to FIG. 10, the virtual volume deletion program 236 displays all the logical volume IDs recorded in the virtual volume table 233 on the management terminal 260 (S132). The virtual volume deletion program 236 then awaits a reply from the management terminal 260 (S133).

The virtual volume deletion program 236 then specifies an entry in the external volume table 232 which corresponds to the logical volume ID designated by the user (S134). More specifically, the virtual volume deletion program 236 acquires the external volume ID which corresponds to the logical volume ID designated by the user from the virtual volume table 233 and specifies the entry in the external volume table 232 which corresponds to this external volume ID.

The virtual volume deletion program 236 subsequently deletes the logical volume ID of the entry in the external volume table 232 which was specified in step S134 (S135). The virtual volume deletion program 236 then deletes the entry in the virtual volume table 233 which possesses the logical volume IDs designated by the user (S136).

Figure 12:
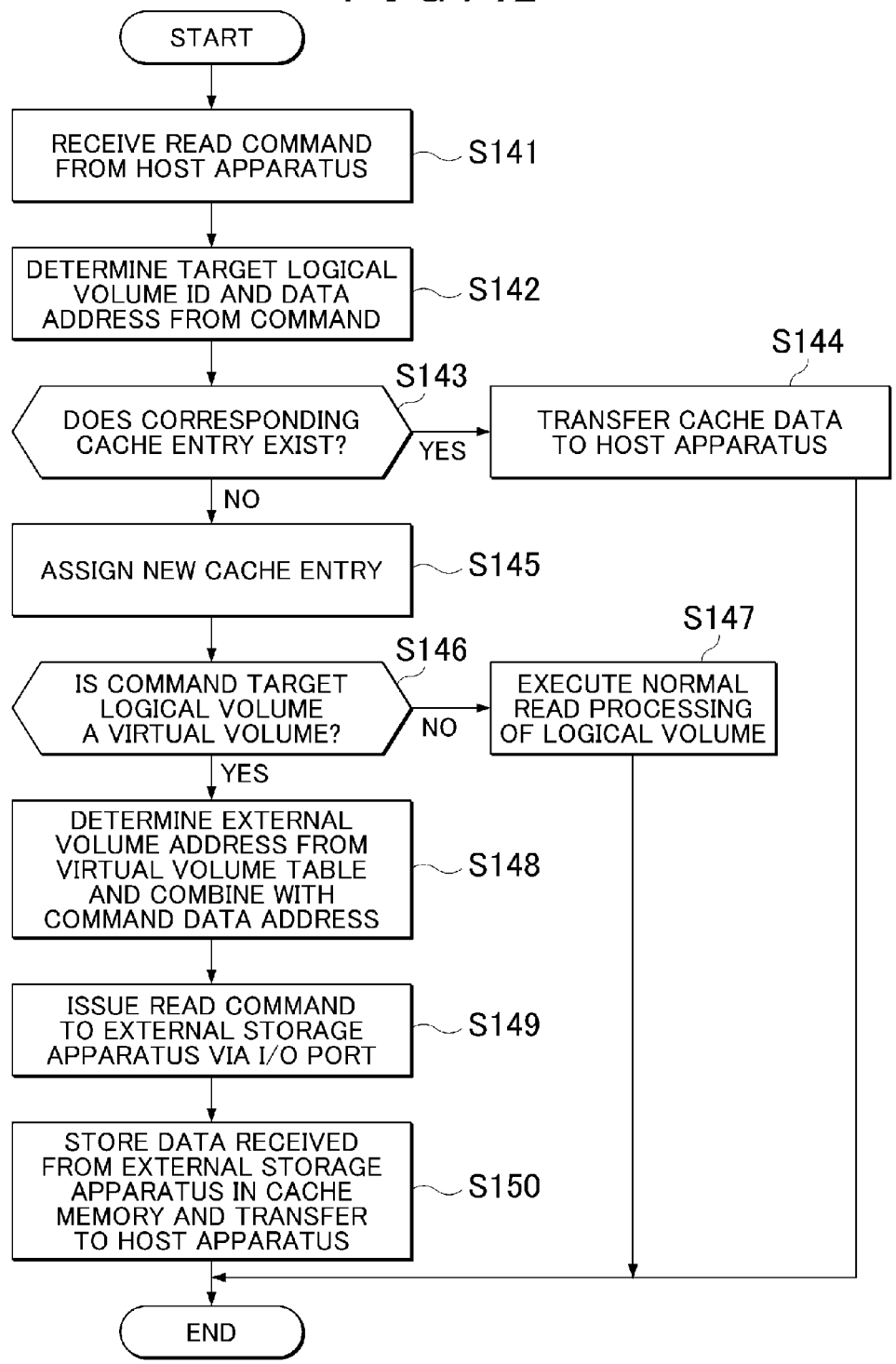
FIG. 12 is a flowchart showing processing content of virtual volume read processing according to the first embodiment.

Virtual volume read processing which is executed by the virtual volume read program 237 will be described next. As shown in FIG. 12, the virtual volume read program 237 first receives a read command from the host apparatus 100 (S141). The virtual volume read program 237 then determines the data address and the logical volume ID which is the read target from the command received in step S141 (S142).

The virtual volume read program 237 then determines whether there is a cache entry which corresponds to the data address and the logical volume ID which is the read target determined in step S142 (S143).

If it is determined in step S143 that there is a corresponding cache entry, the virtual volume read program 237 transfers the data stored in the cache to the host apparatus 100 (S144).

If, however, it is determined in step S143 that there is no corresponding cache entry, the virtual volume read program 237 newly assigns a cache entry (S145).

The virtual volume read program 237 subsequently determines whether the logical volume which is targeted by the command received from the host apparatus 100 is a virtual volume (S146). If, for example, the logical volume ID of the logical volume which is targeted by the command is recorded in the virtual volume table 233, the virtual volume read program 237 may also determine that the logical volume is a virtual volume.

If it is determined in step S146 that the logical volume targeted by the command is a virtual volume, the virtual volume read program 237 executes the processing of step S148 and subsequent steps. If, however, it is determined in step S146 that the logical volume targeted by the command is not a virtual volume, the virtual volume read program 237 executes normal logical volume read processing (S147).

The virtual volume read program 237 subsequently determines the address of the external volume corresponding to the logical volume ID from the virtual volume table 233 and combines the address of the external volume with the data address contained in the command (S148).

The virtual volume read program 237 subsequently issues a read command which was combined in step S148 with the external storage apparatus 500 from the I/O port (S149). The virtual volume read program 237 then stores the data received from the external storage apparatus 500 in the cache entry and transfers the data to the host apparatus (S150).

Figure 13:
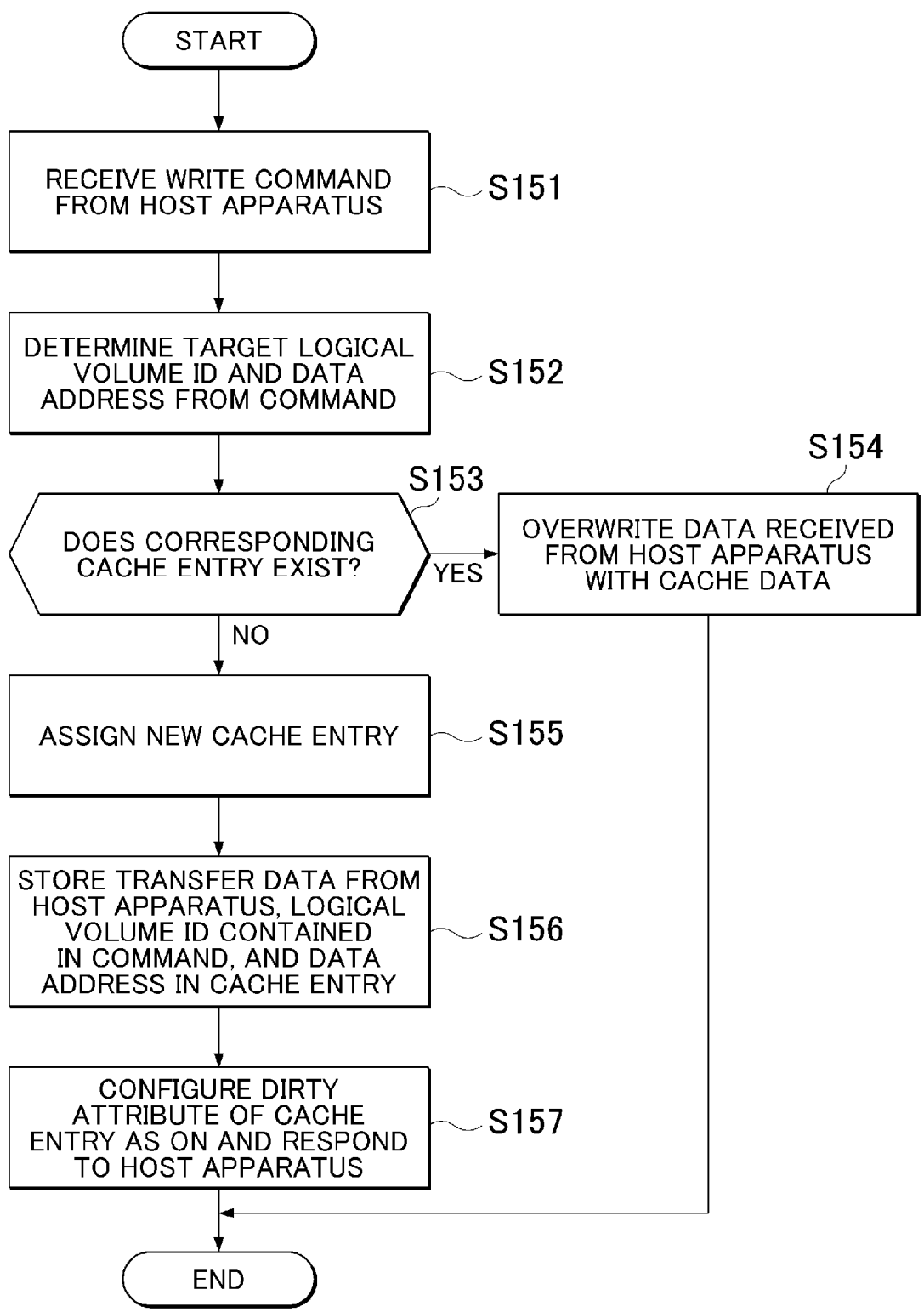
FIG. 13 is a flowchart showing processing content of virtual volume write processing according to the first embodiment.

The virtual volume write processing which is executed by the virtual volume write program 238 will be described next. As shown in FIG. 13, the virtual volume write program 238 first receives a write command from the host apparatus 100 (S151). The virtual volume write program 238 determines the data address and the logical volume ID targeted for writing based on the command received in step S151 (S152).

The virtual volume write program 238 subsequently determines whether there is a cache entry which corresponds to the data address and the logical volume ID targeted for writing which was determined in step S152 (S153).

If it is determined in step S153 that there is a corresponding cache entry, the virtual volume write program 238 overwrites the data stored in the cache with the data received from the host apparatus (S154).

If, however, it is determined in step S153 that there is no corresponding cache entry, the virtual volume write program 238 newly assigns a cache entry (S155).

The virtual volume write program 238 subsequently stores the data transferred from the host apparatus 100 and the logical volume ID and data address contained in the command received from the host apparatus 100 in the cache entry (S156).

The virtual volume write program 238 subsequently configures the dirty attributes of the cache entry as ON, and responds to the host apparatus 100 (S157). Here, the dirty attribute in the cache entry is an attribute which indicates whether, after data has been written to the virtual storage apparatus 200 from the host apparatus 100 and the data is stored in the cache, the data is written to the physical disks 240. In other words, the dirty attribute is configured as ON if the data has not yet been written to the real volume after being stored in the cache, and the dirty attribute is configured as OFF if the data has been written to the physical devices 240.

Figure 14:
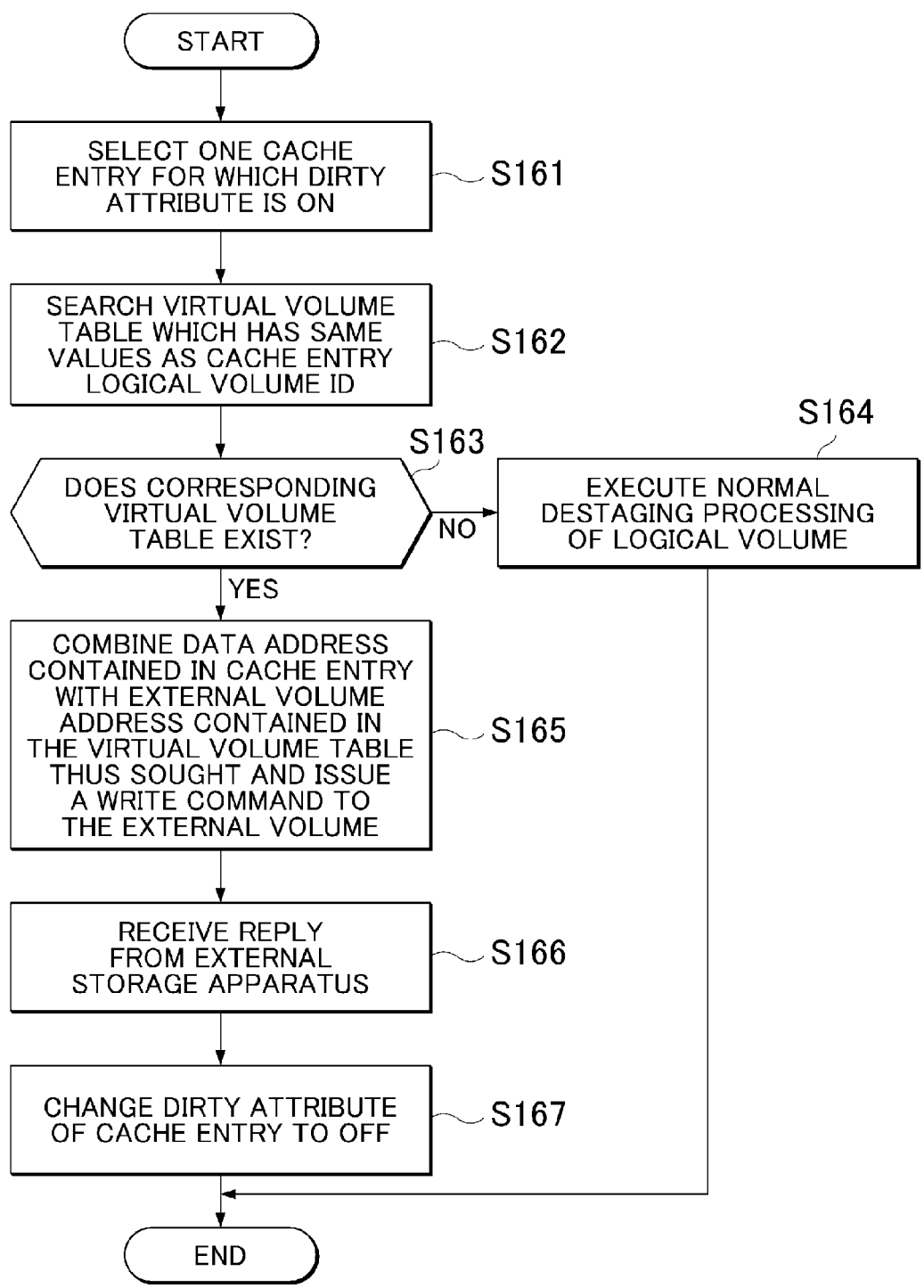
FIG. 14 is a flowchart showing processing content of cache data destaging processing according to the first embodiment.

The cache data destaging processing which is executed by the cache data destaging program 239 will be described next. The destaging processing is processing in which the data in the cache is written to the physical devices 240. As shown in FIG. 14, the cache data destaging program 239 first selects one cache entry for which the dirty attribute is ON from the cache (S161).

The cache data destaging program 239 subsequently searches for an entry in the virtual volume table 233 with the same value as the logical volume ID of the cache entry (S162). Furthermore, the cache data destaging program 239 determines whether there is an entry in the virtual volume table 233 corresponding to the logical volume ID of the cache entry (S163).

If it is determined in step S163 that there is no entry in the virtual volume table 233 which corresponds to the logical volume ID of the cache entry, the cache data destaging program 239 executes normal logical volume destaging processing (S164).

If, however, it is determined in step S163 that there is an entry in the virtual volume table 233 which corresponds to the logical volume ID in the cache entry, the cache data destaging program 239 combines the data address contained in the cache entry with the external volume address which is contained in the virtual volume table 233 and issues a write command to the external volume (S165). The cache data destaging program 239 receives a reply from the external storage apparatus 500 (S166). The cache data destaging program 239 subsequently configures the dirty attribute of the cache entry as OFF (S167).

Note that the foregoing cache data destaging processing is executed by the cache data destaging program 239 in a predetermined cycle.

(1-4) Effect of this Embodiment

According to this embodiment, the virtual storage apparatus 200 detects the external volume of the external storage apparatus 500 and extracts the function information of the external storage apparatus 500 from the attribute information in the external volume and associates the external volume with the function information of the external storage apparatus and, by managing the external volume and logical volume in association with one another, the virtual storage apparatus 200 not only uses the storage area in the external storage apparatus 500 but is also able to use the functions which the external storage apparatus 500 possesses and functions that the virtual storage apparatus 200 does not possess as if they were functions of the virtual storage apparatus 200.

(2) Second Embodiment (2-1) Configuration of Computer System

The hardware configuration of a computer system 2 according to this embodiment is the same as the hardware configuration of the computer system 1 according to the first embodiment and hence a detailed description is not included.

This embodiment differs from the first embodiment in that a virtual storage apparatus 200A utilizes a Thin Provisioning function and a hierarchical storage management (HSM) function. Here, the Thin Provisioning function and hierarchical storage management function which are used in this embodiment will now be described.

The Thin Provisioning function is a function which, instead of providing a logical volume to the host apparatus 100 as a storage area of a fixed capacity, provides a dynamic volume which does not itself possess a storage area to the host apparatus 100 and which assigns partial areas (called segments, pages, and so on) of a pre-prepared storage area (pool) to the area of a dynamic volume that has been written in response to processing in which data is written from the host apparatus 100 to the dynamic volume.

More specifically, with the Thin Provisioning function, one or more logical volumes are defined in a storage area which is provided by one or more physical devices 240. Furthermore, one storage pool is configured from one or more logical volumes and one or more dynamic volumes and one or more dynamic volumes are associated with each of the storage pools. Further, if there is write access to a dynamic volume by the host apparatus 100, the storage area is assigned in units of a predetermined size (hereinafter storage areas of this size are called pages) from any of the logical volumes or virtual volumes in the storage pool associated with the dynamic volume to segments of the dynamic volume undergoing write access.

In addition, the hierarchical storage management function is a function which efficiently performs storage management by using physical devices of a plurality of types of varying performance. For example, highly important data is stored in a high-performance storage tier and low-importance data is stored in a low-performance storage tier. Furthermore, depending on the I/O count per unit time of the logical volume page units, pages with a high I/O load, for example, are placed in a high-performance storage tier, whereas pages with a low I/O load are placed in a low-performance storage tier. Physical devices of a plurality of types of varying performance can be effectively adopted as a result of placing the data in a plurality of storage tiers depending on the importance of the data and the I/O count of the page units.

With the foregoing hierarchical storage management function, a storage pool with different tiers is normally formed using storage devices of a plurality of types of varying performance. In this embodiment, a storage pool of different tiers is formed using storage devices of varying performance and a hierarchical storage pool which utilizes the functions of the external storage apparatus 500 is formed. For example, if the external storage apparatus 500 possesses a deduplication function (Dedup function), the external volume storage area of the external storage apparatus 500 with this function is formed as a single storage tier. Thus, according to this embodiment, instead of forming the storage tiers by considering the performance of the physical devices, the storage tiers can be formed also in view of the functions of the external storage apparatus 500.

(2-2) Configuration of Virtual Storage Apparatus (2-2-1) Hardware Configuration

The hardware configuration of the virtual storage apparatus 200A according to this embodiment is the same as the hardware configuration of the virtual storage apparatus 200A according to the first embodiment and hence a detailed description thereof is not included.

(2-2-2) Software Configuration

The software configuration of the virtual storage apparatus 200A according to this embodiment differs from that of the first embodiment in that a Thin Provisioning function and hierarchical storage management function are provided as mentioned earlier. The configuration which differs from that of the first embodiment will be described in particular detail hereinbelow.

Figure 15:
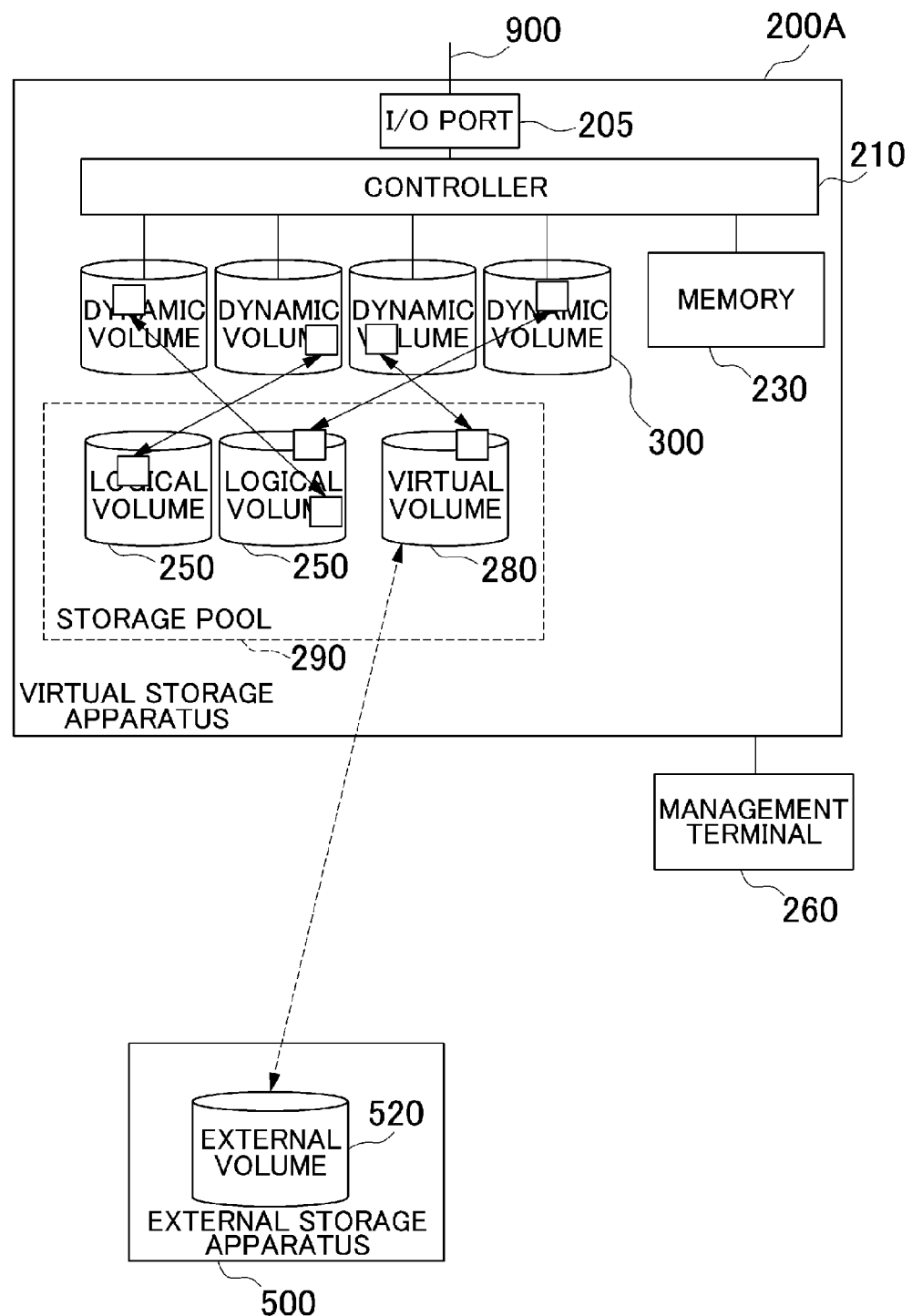
FIG. 15 is a block diagram showing a configuration of a virtual storage apparatus according to a second embodiment.

As shown in FIG. 15, with this embodiment, dynamic volumes 300 are provided to the host apparatus 100 by using the Thin Provisioning function. The dynamic volumes 300 are volumes which do not themselves possess a storage area, and if processing takes place in which data is written to the dynamic volumes from the host apparatus 100, a partial area of a pre-prepared storage area (storage pool) is assigned to dynamic volume area which has been written. The virtual storage apparatus 200A places the area of dynamic volumes in the optimum storage tier in the storage pool 290 depending on a predetermined policy such as importance when assigning the area of the storage pool to the dynamic volume area. As shown in FIG. 15, the storage pool 290 is configured from storage area of the logical volumes 250 which are configured from real volumes in the virtual storage apparatus 200A and storage area of the virtual volumes 280 which are associated with real volumes in the external storage apparatus 500. Furthermore, a plurality of storage tiers are formed using the storage area of the logical volumes 250 and the storage area of the virtual volumes 280.

Figure 16:
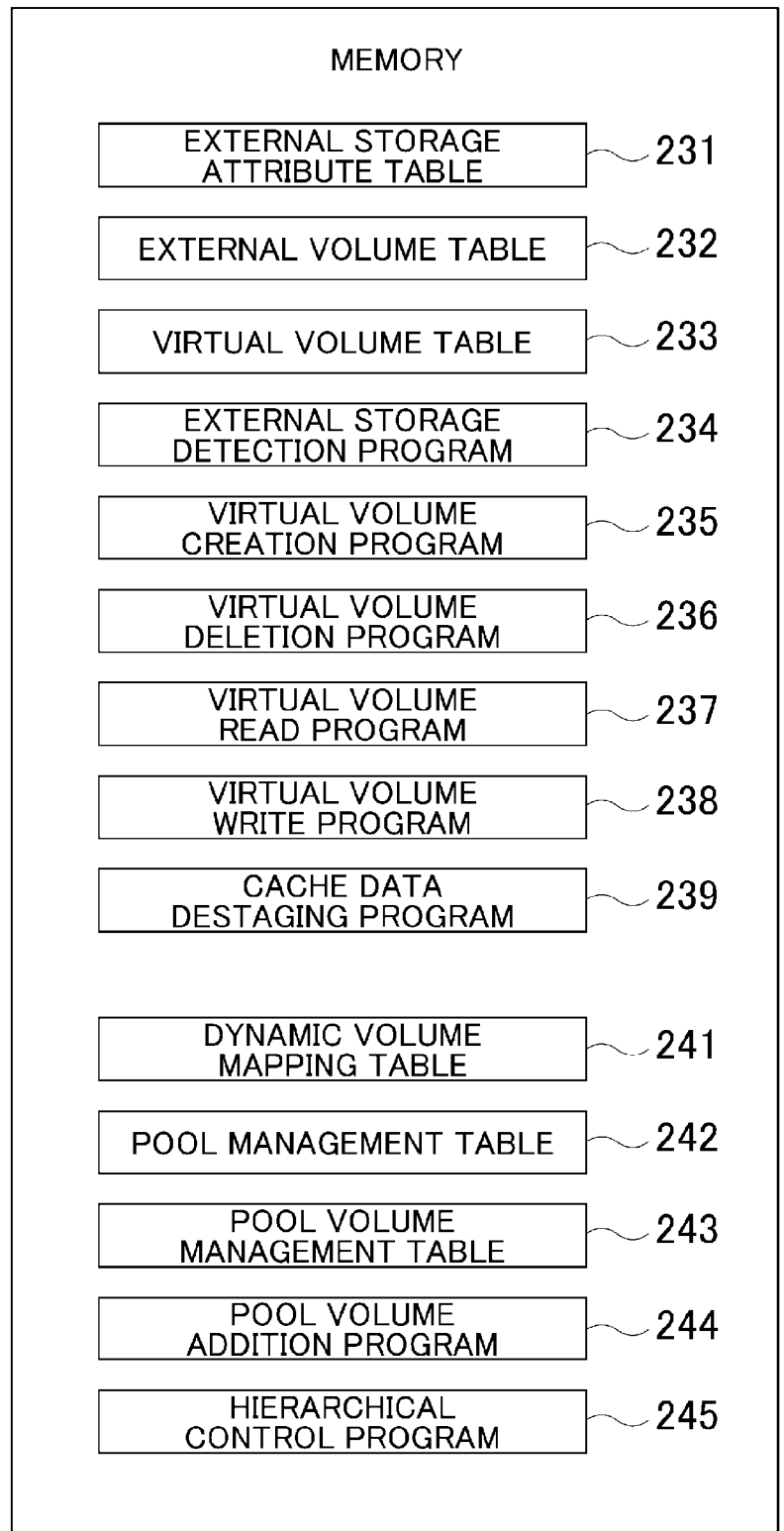
FIG. 16 is a block diagram showing control information of a virtual storage apparatus according to the second embodiment.

In addition, as shown in FIG. 16, the memory 230 of the virtual storage apparatus 200A stores an external storage attribute table 231, an external volume table 232, a virtual volume table 233, an external storage detection program 234, a virtual volume creation program 235, a virtual volume deletion program 236, a virtual volume read program 237, a virtual volume write program 238, a cache data destaging program 239, a dynamic volume mapping table 241, a pool management table 242, a pool volume management table 243, a pool volume addition program 244, and a hierarchical control program 245. The external storage attribute table 231, external volume table 232, virtual volume table 233, external storage detection program 234, virtual volume creation program 235, virtual volume deletion program 236, virtual volume read program 237, virtual volume write program 238, and the cache data destaging program 239 are the same as in the first embodiment and hence a detailed description is not included here.

The dynamic volume mapping table 241 is a table which exists for each dynamic volume 300 and which is used to manage the area assignment state of the corresponding dynamic volume, and which manages hierarchical information of the area of the assigned logical volumes 250 or virtual volumes 280. The dynamic volume mapping table 241 is, as shown in FIG. 17, configured from a logical volume ID field 2411, an LBA field 2412, a frequency information field 2413, and a storage tier field 2414, and in which the rows correspond to the areas of the associated dynamic volume 300 respectively. The logical volume ID field 2411 stores information which identifies the logical volumes (virtual volumes) in the virtual storage apparatus 200A. The LBA field 2412 stores addresses (Logical Block Addresses) which identify predetermined areas in the logical volumes (virtual volumes). The frequency information field 2413 stores information on the frequency of access to the areas of the dynamic volume to which the rows correspond. The storage tier field 2414 stores the tiers to which the areas of the dynamic volume to which the rows correspond belongbelong.

The pool management table 242 is a table for managing the logical volumes 250 (virtual volumes 280) in the storage pool 290 and the storage tiers to which the logical volumes 250 belong and, as shown in FIG. 18, is configured from a logical volume ID field 2421, a storage tier field 2422, and a pool volume management table address field 2423. The logical volume ID field 2421 stores information identifying the logical volumes 250 (virtual volumes 280) in the virtual storage apparatus 200A. The storage tier field 2422 stores information on the storage tiers which are associated with each of the logical volumes 250 (virtual volumes 280). The pool volume management table address field 2423 stores addresses in the pool volume management table 243, described subsequently, which correspond to each of the logical volumes 250 (virtual volumes 280).

The information on storage tiers which are stored in the storage tier field 2412 indicates that, as shown in FIG. 18, storage tier 1 is configured from a logical volume 250 which has a high performance, storage tier 2 is configured from a virtual volume 280 which has an intermediate performance, and storage tier 3 is configured from a virtual volume 280 which has a deduplication function (Dedup function). Thus, according to this embodiment, instead of forming the storage tiers on the basis of the performance of the logical volume 250 or virtual volume 280, the storage tiers can be formed on the basis of the functions of the external storage apparatus 500.

The pool volume management table 243 is a table which exists for each of the logical volumes 250 (virtual volumes 280) in the storage pool 290 and which manages associations between the dynamic volumes 300 and the logical volumes 250 (virtual volumes 280) in the storage pool and, as shown in FIG. 19, is configured from a dynamic volume ID field 2421 and an LBA field 2422, and the rows of this table each correspond to areas of the associated logical volumes 250 (virtual volumes 280) in the storage pool 290. The dynamic volume ID field 2421 stores information identifying dynamic volumes 300. The LBA field 2422 stores addresses of the dynamic volumes 300 to which predetermined areas in the logical volumes (virtual volumes) that the respective rows correspond to are assigned. If processing takes place in which data is written to a dynamic volume 300 from the host apparatus 100, one suitable logical volume 250 among the logical volumes 250 (virtual volumes 280) which are contained in the storage pool 290 which is associated with the dynamic volume 300 is selected, areas of the logical volume 250 (virtual volume 280) are assigned to areas, of the dynamic volume 300, undergoing write processing, and the areas undergoing write processing which are specified by the LBA and the dynamic volume ID of the assigned dynamic volume are recorded in rows, corresponding to the assigned areas, in the pool volume management table 243 which corresponds to the logical volume 250 (virtual volume 280). The areas specified by the LBA will be described subsequently as chunks.

The pool volume addition program 244 is a program which adds logical volumes 250 or virtual volumes 280 within the storage pool 290. More specifically, the pool volume addition program 244 newly creates the pool volume management table 243 in response to a request from the management terminal 260 and stores information on the logical volume IDs of added logical volumes 250 or virtual volumes 280, and pool volume management table 243 in the pool management table 242 in association with one another.

The hierarchical control program 245 is a program which performs hierarchical control of the storage areas of the storage pool 290 which are assigned to the dynamic volumes 300. More specifically, the hierarchical control program 245 calculates the optimum storage tiers for the storage areas of the dynamic volumes 300 based on the frequency information of the dynamic volume mapping table 241 and assigns the storage areas of the dynamic volumes 300 to the optimum storage tiers.

(2-3) Details of the Virtual Storage Apparatus Operation

Details of the operation of the virtual storage apparatus 200A will be provided next. In addition to the external storage detection processing, virtual volume creation processing, virtual volume deletion processing, virtual volume read processing, virtual volume write processing and cache data destaging processing according to the first embodiment in the virtual storage apparatus 200A according to this embodiment, pool volume addition processing, which adds logical volumes 250 or virtual volumes 280 to the storage pool 290, as well as hierarchical control processing, which executes hierarchical control of the storage areas of the storage pool 290 which are assigned to the dynamic volumes 300, are executed.

Figure 20:
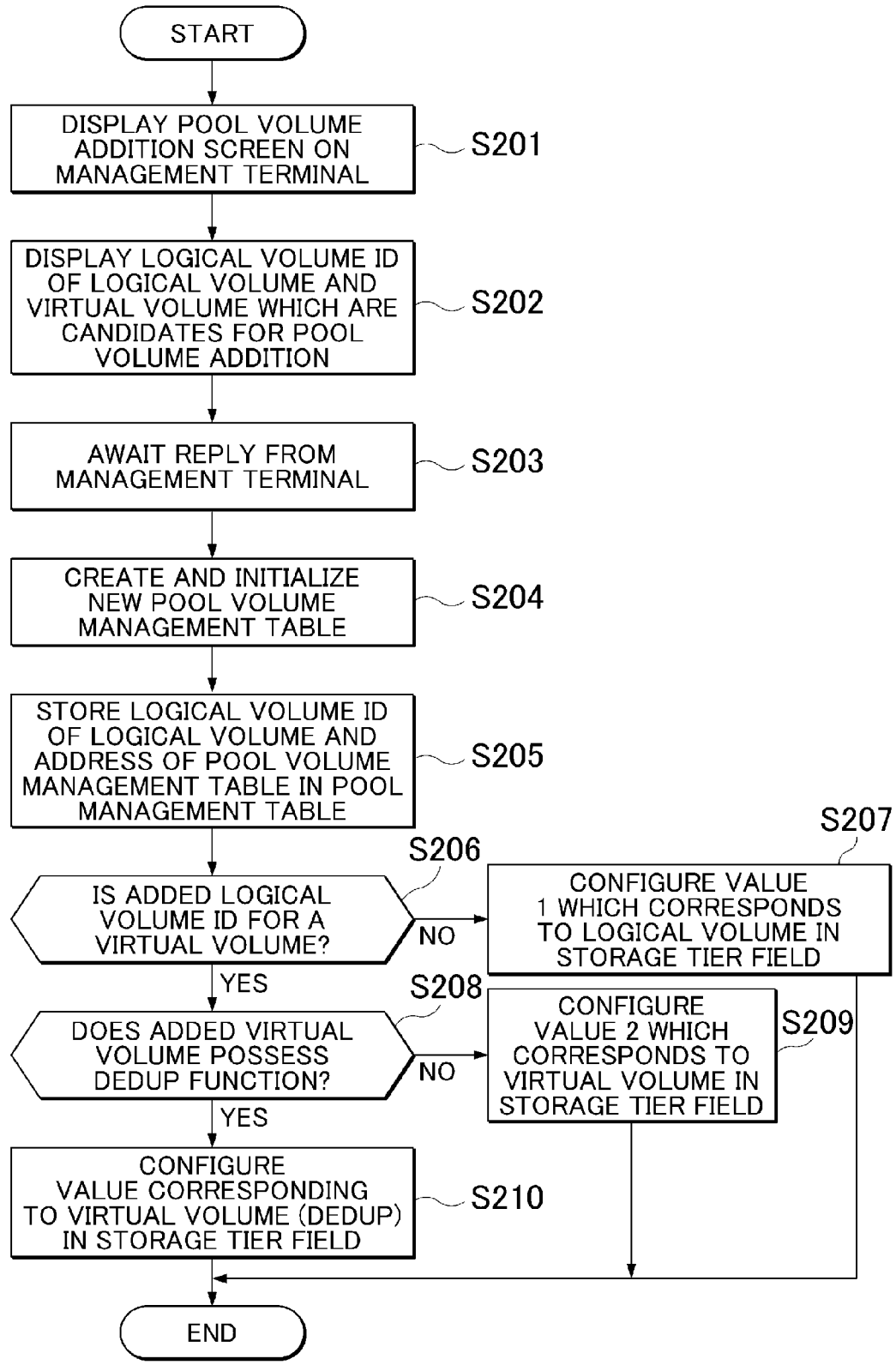
FIG. 20 is a flowchart showing processing content of pool volume addition processing according to the second embodiment.

The pool volume addition processing which is executed by the pool volume addition program 244 will be described first. As shown in FIG. 20, the pool volume addition program 244 displays the pool volume addition screen 820 on the display screen of the management terminal 260 (S201). The pool volume addition program 244 then displays the logical volume IDs of the logical volumes and virtual volumes which are candidates for addition to the pool volume on the pool volume addition screen 820 (S202).

Figure 21:
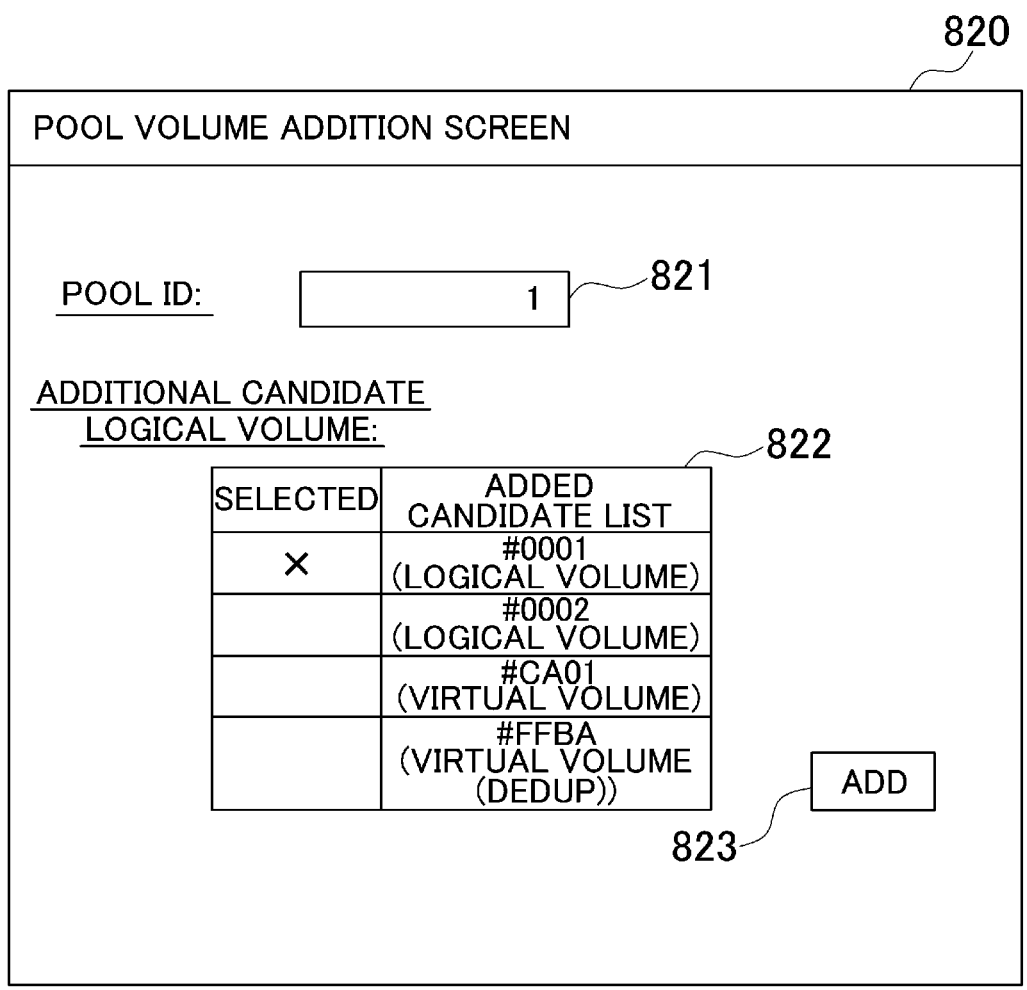
FIG. 21 is a conceptual diagram showing a pool volume addition screen according to the second embodiment.

The pool volume addition screen 820 displayed on the management terminal 260 will now be described. As shown in FIG. 21, the pool volume addition screen 820 displays a pool ID input field 821 and an additional candidate logical volume selection field 822. A number identifying the pool ID is input by the system administrator to the pool ID input field 821. The additional candidate logical volume selection field 822 displays a list of volumes which can be added to the storage pool which correspond to the pool numbers selected by the system administrator. The additional candidate list field may also display logical volume IDs such as, for example, #0001 (logical volume) and #CA01 (virtual volume) and information indicating whether the volumes are logical volumes or virtual volumes. The desired volume is selected from the additional candidate logical volume selection field 822 in response to a system administrator input, and the additional button 823 is pressed.

Returning to FIG. 20, the pool volume addition program 244 awaits a reply from the management terminal 260 (S203). The pool volume addition program 244 then newly creates and initializes a pool volume management table 243 (S204). Furthermore, the pool management table 242 stores the addresses of the pool volume management table 243 created in step S204 and the logical volume IDs of the logical volumes (virtual volumes) which the system administrator indicates should be added (S205).

Furthermore, the pool volume addition program 244 determines whether the logical volume ID for which an addition instruction is given is a logical volume ID of the virtual volume (S206). If it is determined in step S206 that the logical volume ID for which an addition instruction is given is a logical volume ID of a virtual volume, the pool volume addition program 244 determines whether the added virtual volume has a deduplication function (Dedup function) (S208). If, however, it is determined in step S206 that the logical volume ID for which an addition instruction is given is not a logical volume ID of a virtual volume, that is, a logical volume ID, the pool volume addition program 244 stores a value 1 which corresponds to a logical volume in the storage tier field 2412 in the pool management table 242 (S207).

If it is determined in step S208 that the added virtual volume does not possess a deduplication function (Dedup function), the pool volume addition program 244 stores a value 2 which corresponds to a virtual volume in the storage tier field 2412 in the pool management table 242 (S209). If, on the other hand, it is determined that the added virtual volume possesses the deduplication function (Dedup function), the pool volume addition program 244 stores a value 3 which corresponds to a virtual volume (Dedup) which possesses the deduplication function (Dedup function) in the storage tier field 2412 of the pool management table 242 (S210).

Figure 22:
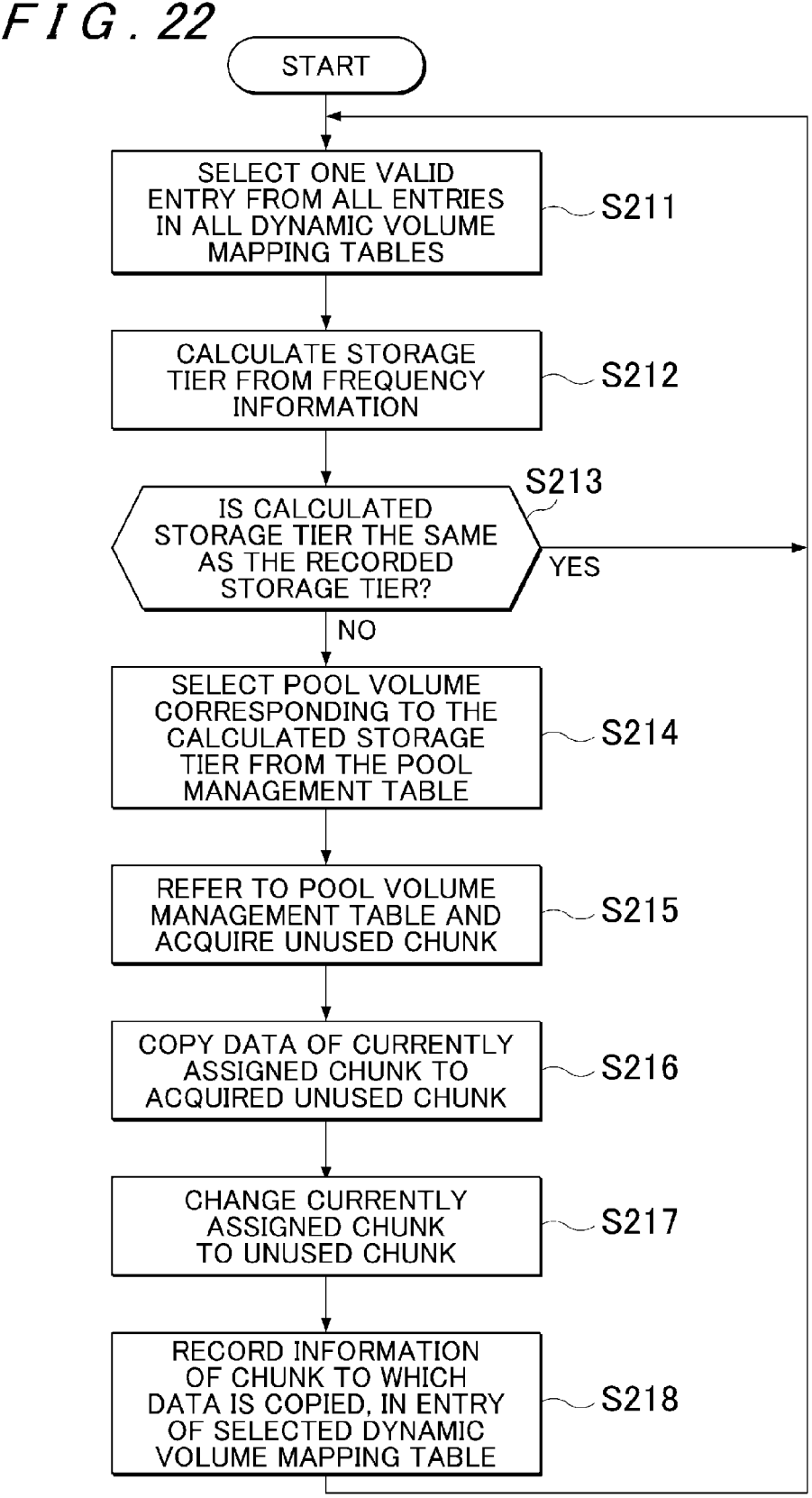
FIG. 22 is a flowchart showing processing content of hierarchical control processing according to the second embodiment.

Hierarchical control processing which is executed by the hierarchical control program 245 will be described next. As shown in FIG. 22, the hierarchical control program 245 selects one valid entry from all the entries (rows) in all the dynamic volume mapping tables 241 (S211). More specifically, the hierarchical control program 245 refers to the dynamic volume mapping table 241 and selects one entry in which a valid value other than the value NULL is stored.

The hierarchical control program 245 then calculates storage tiers from the values in the frequency information field 2403 in the dynamic volume mapping table 241 (S212). More specifically, the hierarchical control program 245 calculates the storage tiers on the basis of the numerical values stored in the frequency information field 2403. If, for example, the frequency information is equal to or more than 100, the storage tier is 1; if the frequency information is between 10 and 100, the storage tier is 2; and if the frequency information is less than 10, the storage tier is 3.

The hierarchical control program 245 determines whether the storage tier calculated in step S212 is the same as the storage tier stored in the storage tier field 2404 in the dynamic volume mapping table 241 (S213).

If it is determined in step S213 that the storage tier calculated in step S212 is the same as the storage tier stored in the storage tier field 2404 in the dynamic volume mapping table 241, the hierarchical control program 245 returns to the processing of step S211.

If, however, it is determined in step S213 that the storage tier calculated in step S212 is not the same as the storage tier stored in the storage tier field 2404 in the dynamic volume mapping table 241, the hierarchical control program 245 selects a pool volume which corresponds to the storage tier calculated in step S212, from the pool management table 242 (S214).

The hierarchical control program 245 subsequently refers to the pool volume management table 243 and acquires an unused area (unused chunk) of the pool volume selected in step S214 (S215). Furthermore, the hierarchical control program 245 copies data of a currently assigned chunk to the unused chunk acquired in step S215 (S216).

The hierarchical control program 245 subsequently changes the currently assigned chunk to the unused chunk (S217). Furthermore, the hierarchical control program 245 records information on the chunk to which data was copied in step S216 in an entry in the selected dynamic volume mapping table (S218).

Note that a fixed tier may also be configured for a specific area or a specific dynamic volume in the dynamic volume mapping table 241. For example, information indicating whether tiers are fixed for each area is provided in the dynamic volume mapping table 241 so that hierarchical control processing is not executed for chunks with fixed tiers. In order to place specific dynamic volumes in fixed tiers, tier fixation is configured for all areas when the dynamic volumes are created. As a result, specific areas or specific dynamic volumes are always capable of storing data in the same storage tier irrespective of the write-processing and read-processing frequencies. For example, as long as virtual volumes (storage tier 3) which possess a deduplication function (Dedup function) are designated as fixed tiers, data can be stored in a virtual volume with a deduplication function (Dedup function).

(2-4) Effect of the Embodiment

As mentioned earlier, according to this embodiment, when storage tiers of storage areas of the storage pool which are assigned to dynamic volumes are constructed, the virtual storage apparatus 200A identifies a function of the external storage apparatus 500 one of the tiers. Accordingly, the functions of the external storage apparatus 500 can be effectively utilized by executing not only storage tiers based on the physical device performance but also storage tiers based on the functions of the external storage apparatus 500.

(3) Third Embodiment (3-1) Configuration of Computer System

The hardware configuration of a computer system 3 according to this embodiment is the same as the hardware configuration of the computer system 1 according to the first embodiment, and hence a detailed description is not included. In this embodiment, a case where a virtual storage apparatus 200B uses the snapshot function of the external storage apparatus 500 will be described in particular detail.

Here, the snapshot function is a function which holds images of a certain logical volume at a certain point in time (for example, at a time when a snapshot acquisition request is received from the host apparatus). By executing the snapshot function at regular intervals in the storage system, the replication (backing up) of data in the logical volumes can be acquired intermittently. Furthermore, a copy of the entire logical volume is not made when data replication is acquired by the snapshot function, and, when the logical volume undergoes write access, write processing is performed after pre-write access data has been restored to the pool snapshot management area. Volumes which are replicated by the snapshot function store only pointer information such as where particular data is stored. Hence, if a plurality of replications are created simultaneously by the snapshot function, management of pointer information on the replicated volumes and management of data which is restored to the snapshot management area and the like must be carried out and the data processing by the host apparatus 100 has sometimes been affected. Therefore, according to this embodiment, functions of the external storage apparatus 500 are effectively adopted by causing the external storage apparatus 500 to execute the data management of the snapshot function.

(3-2) Configuration of Virtual Storage Apparatus (3-2-1) Hardware Configuration

The hardware configuration of the virtual storage apparatus 200B according to this embodiment is the same as the hardware configuration of the virtual storage apparatus 200B according to the first embodiment and hence a detailed description is not included here.

(3-2-2) Software Configuration

The software configuration of the virtual storage apparatus 200B according to this embodiment differs from that of the first embodiment in that, as mentioned earlier, the snapshot function of the external storage apparatus 500 is employed. The configuration which differs from the first embodiment will be described hereinbelow in particular detail.

Figure 23:
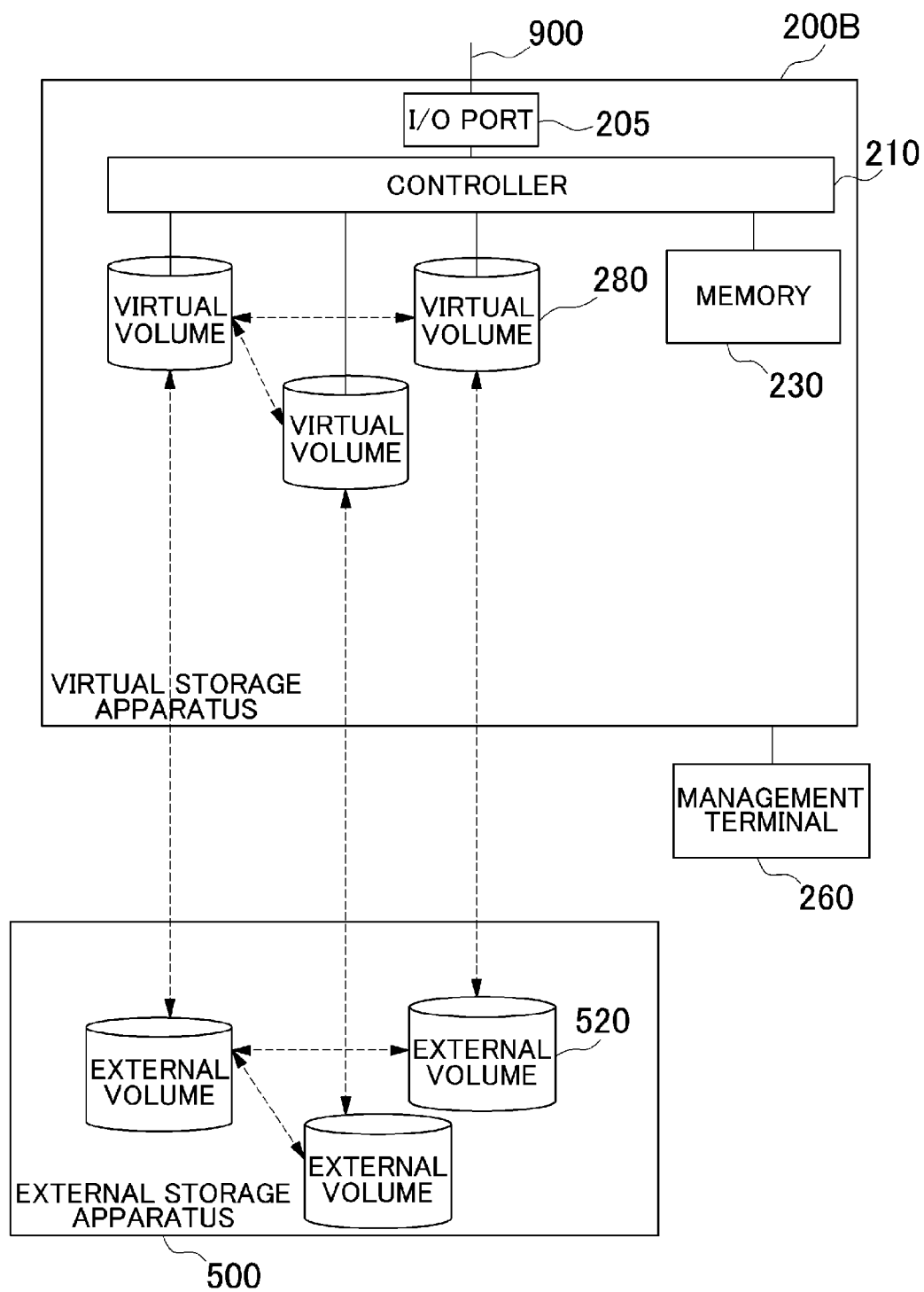
FIG. 23 is a block diagram showing a configuration of a virtual storage apparatus according to a third embodiment.

As shown in FIG. 23, with this embodiment, as mentioned earlier, a plurality of snapshot volumes are created by using the snapshot function in the external storage apparatus 500, and the snapshot volume of the external storage apparatus 500 is associated with the virtual volume 280 of the virtual storage apparatus 200B. Accordingly, the pointer information and the like in the snapshot volume created by the snapshot function and the like can be managed within the external storage apparatus 500 instead of being managed within the virtual storage apparatus 200B.

Figure 24:
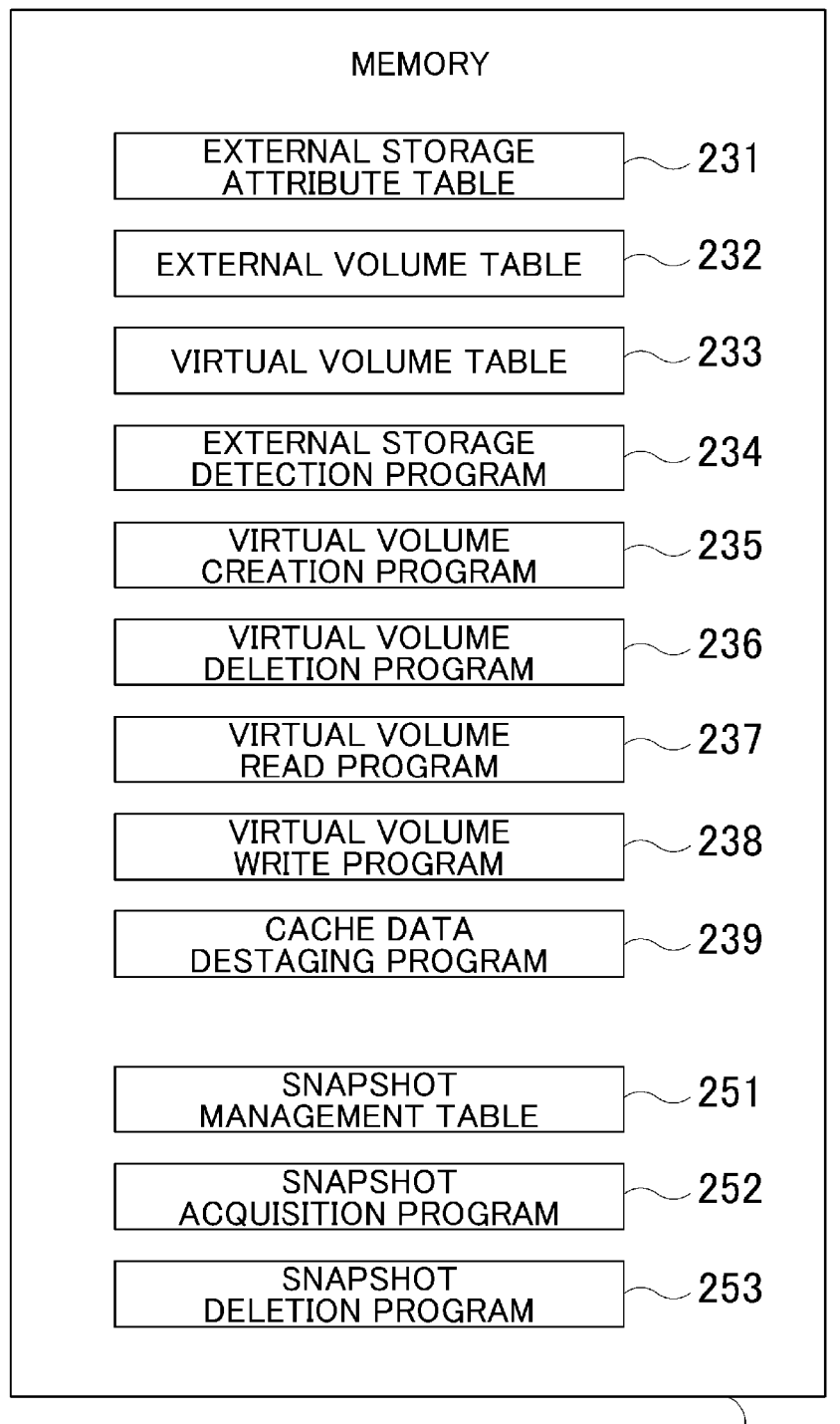
FIG. 24 is a block diagram showing control information of the virtual storage apparatus according to the third embodiment.

In addition, as shown in FIG. 24, the memory 230 of the virtual storage apparatus 200B stores an external storage attribute table 231, an external volume table 232, a virtual volume table 233, an external storage detection program 234, a virtual volume creation program 235, a virtual volume deletion program 236, a virtual volume read program 237, a virtual volume write program 238, a cache data destaging program 239, a snapshot management table 251, a snapshot acquisition program 252, and a snapshot deletion program 253. The external storage attribute table 231, the external volume table 232, the virtual volume table 233, the external storage detection program 234, the virtual volume creation program 235, the virtual volume deletion program 236, the virtual volume read program 237, the virtual volume write program 238, and the cache data destaging program 239 are the same as those of the first embodiment, and hence a detailed description is not provided here.

The snapshot management table 251 is a table for managing the correspondence relationships between the snapshot volumes in the external storage apparatus 500 and the virtual volumes 280 in the virtual storage apparatus 200B and, as shown in FIG. 25, is configured from a snapshot volume field 2501 and a logical volume ID field 2502. The snapshot volume field 2501 stores volume names of the snapshot volumes managed by the external storage apparatus 500. The logical volume ID field 2502 stores the logical volume IDs of the virtual volumes 280 in the virtual storage apparatus 200B. It is clear, from the snapshot management table 251, which of the snapshot volumes in the external storage apparatus 500 is associated with which virtual volume in the virtual storage apparatus 200B.

The snapshot acquisition program 252 is a program for acquiring snapshots in response to a system administrator input. More specifically, if a volume which is a snapshot acquisition target is a virtual volume, the snapshot acquisition program 252 creates a snapshot volume in the external storage apparatus 500 and records, in the snapshot management table 251, a snapshot volume in the external storage apparatus 500 and a virtual volume in the virtual storage apparatus 200 in association with one another.

The snapshot deletion program 253 is a program which deletes snapshots in response to a system administrator input. More specifically, the snapshot deletion program 253 deletes the corresponding snapshot management table 251 by causing the external storage apparatus 500 to delete deletion target volumes in cases where the volumes which are snapshot deletion targets are virtual volumes which are associated with volumes in the external storage apparatus 500 which possesses the snapshot function.

(3-3) Details of Virtual Storage Apparatus Operation

Details of the operation of the virtual storage apparatuses 200B will be described next. In addition to the external storage detection processing, the virtual volume creation processing, the virtual volume deletion processing, the virtual volume read processing, the virtual volume write processing and the cache data destaging processing according to the first embodiment by the virtual storage apparatus 200B according to this embodiment, snapshot acquisition processing which acquires snapshots and snapshot deletion processing which deletes snapshots are executed.

Figure 26:
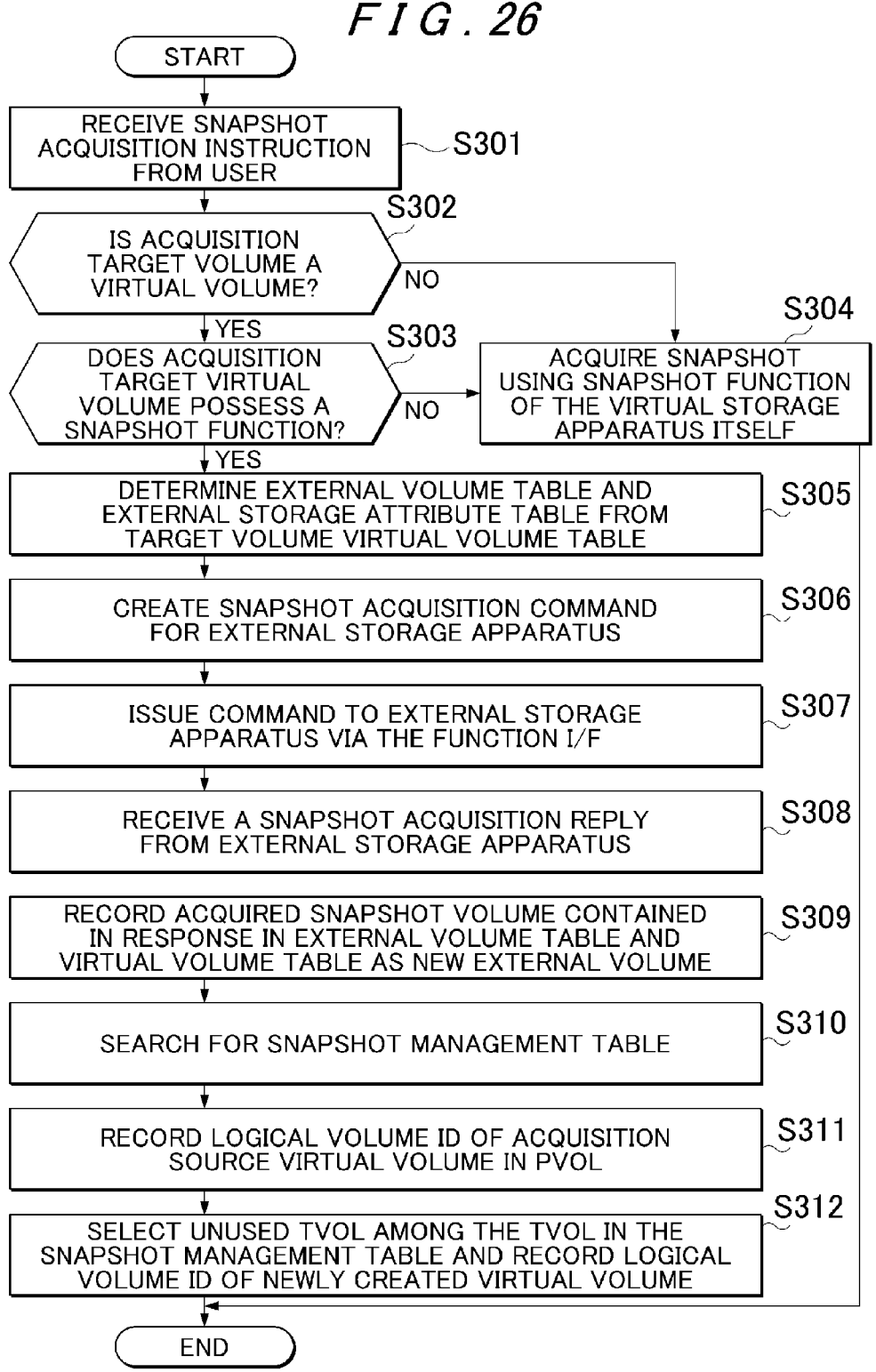
FIG. 26 is a flowchart showing processing content of snapshot acquisition processing according to the third embodiment.

Snapshot acquisition processing which is executed by the snapshot acquisition program 252 will first be described. As shown in FIG. 26, the snapshot acquisition program 252 receives a snapshot acquisition instruction from the user such as the system administrator via the management terminal 260 (S301).

The snapshot acquisition program 252 subsequently determines whether the snapshot acquisition target volume is a virtual volume which is associated with the external storage apparatus 500 (S302).

If it is determined in step S302 that a snapshot acquisition target volume is a virtual volume, the snapshot acquisition program 252 determines whether the snapshot acquisition target virtual volume possesses the snapshot function (S303). More specifically, the snapshot acquisition program 252 refers to the external volume table 232 and the virtual volume table 233 shown in FIG. 5 and determines whether an external volume associated with the virtual volume is a volume which possesses the snapshot function. If, however, it is determined in step S302 that the snapshot acquisition target volume is not a virtual volume, the snapshot acquisition program 252 acquires a snapshot by using the snapshot function of the virtual storage apparatus 200 itself (S304).

If it is determined in step S303 that the snapshot acquisition target virtual volume possesses a snapshot function, the snapshot acquisition program 252 determines the external volume table 232 and external storage attribute table 231 from the snapshot acquisition target virtual volume table 233 (S305). More specifically, the snapshot acquisition program 252 refers to the virtual volume table 233 and acquires the external volume table 232 which corresponds to the external volume ID associated with the logical volume ID of the snapshot acquisition target virtual volume. Furthermore, the snapshot acquisition program 252 acquires the external storage attribute table 231 from the device type IDs in the external volume table 232 which corresponds to the external volume.

The snapshot acquisition program 252 subsequently creates a snapshot acquisition command for the external storage apparatus 500 (S306). More specifically, the snapshot acquisition program 252 uses a snapshot acquisition command format which is stored in the function command template field 2314 of the external storage attribute table 231 acquired in step S305 to create a snapshot acquisition command. The snapshot acquisition command configures an operation code for directing the creation of snapshots and the address of the primary volume which is to be the snapshot volume source and the like.

The snapshot acquisition program 252 subsequently issues the snapshot acquisition command which was created in step S306 to the external storage apparatus 500 via a function I/F (S307). The snapshot acquisition program 252 receives a snapshot acquisition reply from the external storage apparatus 500 (S308) and records the snapshot volume which is contained in the snapshot acquisition reply in the external volume table 232 and the virtual volume table 233 as a new external volume (S309).

The snapshot acquisition program 252 subsequently searches for a snapshot management table 251 for which the logical volume ID of the virtual volume which is the snapshot acquisition source is associated with PVOL (S310). If, in step S310, there is no snapshot management table 251 for which the logical volume ID of the snapshot acquisition source virtual volume is associated with the PVOL, the snapshot acquisition program 252 newly creates and initializes the snapshot management table 251. More specifically, the snapshot acquisition program 252 records the logical volume IDs of the acquisition source virtual volumes in association with the PVOL of the newly created snapshot management table 251 (S311).

The snapshot acquisition program 252 selects unused logical volume ID fields 2502 which correspond to the TVOL of the snapshot management table 251 and records the logical volume IDs of the newly created virtual volumes 280 in the logical volume ID fields 2502 (S312).

Accordingly, in this embodiment, if a volume in the virtual storage apparatus 200 is a virtual volume 280 which is associated with the external storage apparatus 500, a snapshot volume is created by the external storage apparatus 500 to associate the snapshot volume created by the external storage apparatus 500 with the virtual volume in the new virtual storage apparatus 200. The virtual storage apparatus 200 is accordingly able to utilize the snapshot function of the external storage apparatus 500 instead of using its own snapshot function.

Snapshot deletion processing which is executed by the snapshot deletion program 253 will be described next. As shown in FIG. 27, the snapshot deletion program 253 receives a snapshot deletion instruction from the user such as the system administrator via the management terminal 260 (S321).

The snapshot deletion program 253 then determines whether the snapshot deletion target volume is a virtual volume which is associated with the external storage apparatus 500 (S322).

If it is determined in step S322 that the snapshot deletion target volume is a virtual volume, the snapshot deletion program 253 determines whether the snapshot acquisition target virtual volume possesses a snapshot function (S323). If, however, it is determined in step S322 that the snapshot deletion target volume is not a virtual volume, the snapshot deletion program 253 uses the snapshot function of the virtual storage apparatus 200 itself to delete the snapshot (S324).

Furthermore, if it is determined in step S323 that the snapshot deletion target virtual volume possesses the snapshot function, the snapshot deletion program 253 searches the snapshot management table 251 in which the logical volume ID of the snapshot acquisition source virtual volume is recorded as the PVOL (S325).

The snapshot deletion program 253 then determines the virtual volume table 233, the external volume table 232, and the external storage attribute table 231 based on the logical volume ID which corresponds to the deletion target TVOL (S326). More specifically, the snapshot deletion program 253 specifies the virtual volume table 233 in which the logical volume ID corresponding to the deletion target TVOL is recorded and specifies the external volume ID which corresponds to the logical volume ID. The snapshot deletion program 253 then specifies the external volume table 232 in which the external volume ID is recorded and specifies the device type ID corresponding to the external volume ID. The snapshot deletion program 253 also specifies the external storage attribute table in which the device type ID is recorded.

The snapshot deletion program 253 subsequently creates a snapshot deletion command for the external storage apparatus 500 (S327). More specifically, the snapshot deletion program 252 uses the snapshot deletion command format which is stored in the function command template field 2314 of the external storage attribute table 231 in step S326 to create a snapshot deletion command. The snapshot deletion command is configured with an operation code indicating snapshot deletion, the address of the primary volume which is the source of the snapshot volume and the address of the deletion-target snapshot volume, and the like, for example.

The snapshot deletion program 253 subsequently issues the snapshot deletion command which was created in step S327 to the external storage apparatus 500 via the function I/F (S328). The snapshot deletion program 253 then receives a snapshot deletion reply from the external storage apparatus 500 (S329) and deletes the entry in the virtual volume table 233 and the entry in the external volume table 232 which correspond to the deletion target TVOL (S330).

Furthermore, the snapshot deletion program 253 updates the TVOL of the snapshot management table 251 to an unused state (S331). More specifically, the snapshot deletion program 253 stores a NULL value in the logical volume ID field 2502 which corresponds to the deletion target TVOL in the snapshot management table 251.

The snapshot deletion program 253 subsequently deletes the snapshot management table 251 when none of the TVOL in the snapshot management table 251 is used (S332).

(3-4) Effect of Embodiment

With this embodiment, when the virtual storage apparatus 200B is connected to the external storage apparatus 500 with a snapshot function and acquires a snapshot of a virtual volume which is associated with the external volume, the virtual storage apparatus 200B transmits a request to generate an external volume snapshot volume to the external storage apparatus 500, receives information for generating the snapshot volume from the external storage apparatus 500, and manages the snapshot volume generated by the external storage apparatus 500 and the newly generated virtual volume in association with one another. Accordingly, the pointer information and the like in the snapshot volume generated by the snapshot function is managed in the external storage apparatus 500 instead of being managed in the virtual storage apparatus 200B so that the functions of the external storage apparatus 500 can be effectively used.

(4) Further Embodiments

Although a case was described in the above embodiment where the controller 210 is applied as a control unit which controls all the processing relating to various functions according to this embodiment but the present invention is not limited to this case, rather, the hardware and software which execute the processing as this control unit may also be provided separately from the controller 210. The same effects as those of the foregoing embodiment can thus be obtained.

Furthermore, each of the steps in the processing of the virtual storage apparatus 200 of this specification, for example, need not necessarily be processed in chronological order in the order presented in the flowchart. That is, each of the steps of the processing of the virtual storage apparatus 200 may also be executed in parallel even though they may be different processes.

A computer program enabling hardware such as the CPU, ROM, and RAM contained in the virtual storage apparatus 200 to exhibit the same functions as each of the configurations of the foregoing virtual storage apparatus 200 can also be created. A storage medium storing this computer program is also provided.

Furthermore, according to the above embodiment, a case where a deduplication function (Dedup function) and a snapshot function are used as functions of the external storage apparatus 500 which are used by the virtual storage apparatus 200 was described and, a case which makes combined usage of a deduplication function (Dedup function) of the external storage apparatus 500 and a hierarchical storage management function of the virtual storage apparatus 200 was described, but the functions to which the present invention is applied and the combinations of functions are not limited to the aforementioned functions and combinations, rather, same can also easily be extended to other functions of the external storage apparatus 500 and the virtual storage apparatus 200. For example, if the external storage apparatus 500 possesses a MAID (Massive Arrays of Inactive Disks) function, which is a power savings function, the virtual storage apparatus 200 is able to use the MAID function in accordance with the content described in the above embodiment. The same is also true for other functions.

Furthermore, in the embodiment described in this specification, for example, when the virtual storage apparatus 200 uses the functions of the external storage apparatus 500, a command which is created by the command template is issued directly to the external storage apparatus 500 via a function I/F, but the functions of the external storage apparatus 500 may also be used by way of another method. For example, an instruction may be issued from the management terminal 260 of the virtual storage apparatus 200 to the management terminal 510 of the external storage apparatus 500 and the management terminal 510 which receives this instruction may control the external storage apparatus 500. The same is also true for other methods.

INDUSTRIAL APPLICABILITY

The present invention can be applied to a storage apparatus which uses the storage area and functions of another storage apparatus.

REFERENCE SIGNS LIST

100 Host apparatus
200, 200A, 200B Virtual storage apparatus
205 Port
210 Controller
230 Memory
231 External storage attribute table
232 External volume table
233 Virtual volume table
234 External storage detection program
235 Virtual volume creation program
236 Virtual volume deletion program
237 Virtual volume read program
238 Virtual volume write program
239 Cache data destaging program
240 Physical device
250 Logical volume
260 Management terminal
500 External storage apparatus
900, 950 Network

The invention claimed is:

1. A storage apparatus which is connected to a host apparatus requesting data I/Os and connected to an external storage apparatus comprising a storage device respectively via a network, comprising:
   a control device configured to control data writing to a storage area,
   wherein the storage device of the external storage apparatus is configured to store data which is read and written by the host apparatus,
   wherein the control device is further configured to:
      manage function information which indicates a function executed by a controller of each of a plurality of storage apparatuses which are available as the external storage apparatus;
      provide a predetermined storage area of the storage device of the external storage apparatus to the host apparatus as one or more virtual volumes, and manage IDs of the one or more virtual volumes;
      obtain attribute information of the predetermined storage area from the external storage apparatus;
      specify the function provided by the external storage apparatus which provides the predetermined storage area by referring to the managed function information; and
      manage each of the one or more virtual volumes with the function information which indicates the specified function for the predetermined storage area associated with each of the virtual volumes.

2. The storage apparatus according to claim 1,
wherein the control device is further configured to:
manage the predetermined storage area of the storage device of the external storage apparatus as one or more external volumes,
record the function information of the external storage apparatus to which the one or more external volumes belong and record the external volumes in an external volume table in association with one another, and
record IDs of the external volumes and IDs of the virtual volumes in a virtual volume table in association with one another.

3. The storage apparatus according to claim 2,
wherein the control device is further configured to:
   display an external volume list field which indicates a list of the external volumes on a display screen of a management terminal operated by a system administrator, and
   select the external volume with a specific function in response to an operation of the system administrator and display the volume in the external volume list field.

4. The storage apparatus according to claim 2,
wherein the control device is further configured to:
   detect the external volumes of the connected external storage apparatus and attribute information of the external volumes, and extract function information of the external storage apparatus to which the external volumes belong from the attribute information of the external volumes.

5. The storage apparatus according to claim 2, wherein the control device is further configured to:
when a snapshot function is contained in the function information of the external storage apparatus and a logical volume which is a snapshot acquisition target is a virtual volume of the one or more virtual volumes which is associated with one of the one or more external volumes, transmit a request to generate a snapshot volume of the external volume to the external storage apparatus,
receive snapshot volume generation information from the external storage apparatus, and
record the snapshot volume and the newly generated virtual volume in the snapshot management table in association with one another.

6. The storage apparatus according to claim 1,
wherein the control device is further configured to:
record information identifying the type of external storage apparatus and the function information and records this information in the external storage attribute table in association with one another.

7. The storage apparatus according to claim 1,
wherein the control device is further configured to:
when data writing by the host apparatus has taken place, associate the storage area of the storage apparatus or a predetermined storage area of the external storage apparatus with a dynamic volume,
wherein the dynamic volume and a logical volume or a virtual volume of the one or more virtual volumes which provides the predetermined storage area are recorded in a dynamic volume mapping table in association with one another.

8. The storage apparatus according to claim 7,
wherein the control device is further configured to:
manage the storage areas which are provided by storage devices of a plurality of types of varying performance as different storage tiers and manages the external volume which corresponds to predetermined function information as one of the storage tiers.

9. The storage apparatus according to claim 1, wherein the functions of the external storage apparatus comprise, at least one of: deduplication and snapshot.

10. A method of controlling a storage apparatus which is connected to a host apparatus which requests data I/Os and to an external storage apparatus comprising a storage device via a network,
wherein the storage apparatus is configured to provide a predetermined storage area of the storage device of the external storage apparatus to the host apparatus as one or more virtual volumes and to manage a predetermined storage area of the storage device of the external storage apparatus as one or more external volumes, the method comprising:
detecting the external volumes of the external storage apparatus;
extracting function information of the external storage apparatus from attribute information of the external volumes, the function information indicating a function executed by a controller of each of a plurality of storage apparatuses which are available as the external storage apparatus;
recording the external volumes and the function information indicating the functions of the external storage apparatus in an external volume table in association with one another; and
recording IDs of the external volumes and IDs of the virtual volumes in a virtual volume table in association with one another.

11. A method of a storage apparatus which is connected to a host apparatus requesting data I/Os and connected to an external storage apparatus comprising a storage device respectively via a network and which includes a control device configured to control data writing to a storage area, the storage device is configured to store data which is read and written by the host apparatus, the method comprising:
managing, by the control device, function information which indicates a function executed by a controller of each of a plurality of storage apparatuses which are available as the external storage apparatus;
providing, by the control device, a predetermined storage area of the storage device of the external storage apparatus to the host apparatus as one or more virtual volumes, and manage IDs of the one or more virtual volumes;
obtaining, by the control device, attribute information of the predetermined storage area from the external storage apparatus;
specifying, by the control device, the function provided by the external storage apparatus which provides the predetermined storage area by referring to the managed function information; and
managing, by the control device, each of the one or more virtual volumes with the function information which indicates the specified function for the predetermined storage area associated with each of the virtual volumes.

* * * * *